United States Patent
Alpert et al.

(10) Patent No.: US 10,904,916 B2
(45) Date of Patent: Jan. 26, 2021

(54) ACCESS POINT (AP), STATION (STA) AND METHODS FOR SIGNALING OF BASIC SERVICE SET (BSS) COLORS

(71) Applicant: Intel IP Corporation, Santa Clara, CA (US)

(72) Inventors: Yaron Alpert, Hod Hasharoni (IL); Po-Kai Huang, San Jose, CA (US); Daniel F. Bravo, Hillsboro, OR (US); Laurent Cariou, Portland, OR (US); Chittabrata Ghosh, Fremont, CA (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 21 days.

(21) Appl. No.: 16/321,814

(22) PCT Filed: Jun. 28, 2017

(86) PCT No.: PCT/US2017/039708
§ 371 (c)(1),
(2) Date: Jan. 29, 2019

(87) PCT Pub. No.: WO2018/080603
PCT Pub. Date: May 3, 2018

(65) Prior Publication Data
US 2019/0246423 A1  Aug. 8, 2019

Related U.S. Application Data

(60) Provisional application No. 62/412,914, filed on Oct. 26, 2016.

(51) Int. Cl.
*H04W 4/00*  (2018.01)
*H04W 74/00*  (2009.01)
*H04L 5/00*  (2006.01)
*H04W 24/10*  (2009.01)
*H04W 48/16*  (2009.01)
*H04W 84/12*  (2009.01)

(52) U.S. Cl.
CPC ......... *H04W 74/006* (2013.01); *H04L 5/0055* (2013.01); *H04W 24/10* (2013.01); *H04W 48/16* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2015/0065157 A1* | 3/2015 | Homchaudhuri ... | H04W 84/005 455/452.1 |
| 2016/0007247 A1* | 1/2016 | Lee ................... | H04W 36/0072 370/331 |

(Continued)

FOREIGN PATENT DOCUMENTS

| WO | WO-2016087917 A1 | 6/2016 |
|---|---|---|
| WO | WO-2016112306 A1 | 7/2016 |
| WO | WO-2018080603 A1 | 5/2018 |

OTHER PUBLICATIONS

"International Application Serial No. PCT/US2017/039708, International Search Report dated Oct. 30, 2017", 3 pgs.

(Continued)

*Primary Examiner* — Phirin Sam
(74) *Attorney, Agent, or Firm* — Schwegman Lundberg & Woessner, P.A.

(57) ABSTRACT

Embodiments of an access point (AP), station (STA) and method of communication are generally described herein. The AP may include a used basic service set (BSS) color in a downlink physical layer convergence procedure protocol, data unit (PPDU). The used BSS color may indicate communication between the AP and associated STAs. The AP may detect another PPDU from an STA that is un associated with the AP. If a header portion of the detected PPDU includes the used BSS color, the AP may: determine an alternate BSS color, and transmit a color switch announce- (Continued)

ment (CSA) element that indicates the alternate BSS color. The CSA element may be configurable to further indicate whether the AP and the associated STAs are to switch, from the operating channel to an alternate channel for the communication.

24 Claims, 10 Drawing Sheets

(56) References Cited

U.S. PATENT DOCUMENTS

2016/0150514 A1    5/2016  Kwon et al.
2016/0330764 A1*  11/2016  Kim ................... H04W 74/004
2017/0041954 A1*   2/2017  Tsai ................... H04W 16/14
2017/0367129 A1*  12/2017  Yang .................. H04L 41/08

OTHER PUBLICATIONS

"International Application Serial No. PCT/US2017/039708, Written Opinion dated Oct. 30, 2017", 9 pgs.
Geonjung, Ko, et al., "BSS Color Collision", IEEE 802.1116/0640r3, [Online]. Retrieved from the Internet: <https//mentor ieee.org/802.11/documentsis_dcn0640is_Year2016>, (May 18, 2016).
Geonjung, Ko, et al., "Issues on BSS Color Bits Collision", IEEE 802.II16/0396r0, [Online]. Retrieved from the Internet: <https//mentor ieee.org/802 II/documentsis_dcn0396is_year2016>, (Mar. 14, 2016).
"International Application Serial No. PCT US2017 039708, International Preliminary Report on Patentability dated May 9, 2019", 11 pgs.

* cited by examiner

ACCESS POINT (AP), STATION (STA) AND METHODS FOR SIGNALING OF BASIC SERVICE SET (BSS) COLORS

PRIORITY CLAIM

This application is a U.S. National Stage Filing under 35 U.S.C. 371 from International Application No. PCT/US2017/039708, filed Jun. 28, 2017 and published in English as WO 2018/080603 on May 3, 2018, which claims the benefit of priority to U.S. Provisional Patent Application Ser. No. 62/412,914, filed Oct. 26, 2016, each of which is incorporated herein by reference in its entirety.

TECHNICAL FIELD

Embodiments pertain to wireless communications. Some embodiments relate to wireless local area networks (WLANs) and Wi-Fi networks including networks operating in accordance with the IEEE 802.11 family of standards, including but not limited to IEEE 802.11ax. Some embodiments relate to basic service set (BSS) colors, including signaling of BSS colors.

BACKGROUND

Wireless communications have been evolving toward ever increasing data rates (e.g., from IEEE 802.11a/g to IEEE 802.11n to IEEE 802.11ac and IEEE 802.11ad). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios. In addition, IEEE 802.11ad, IEEE 802.11ay and/or other technologies may be used in these and other scenarios, in some cases.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
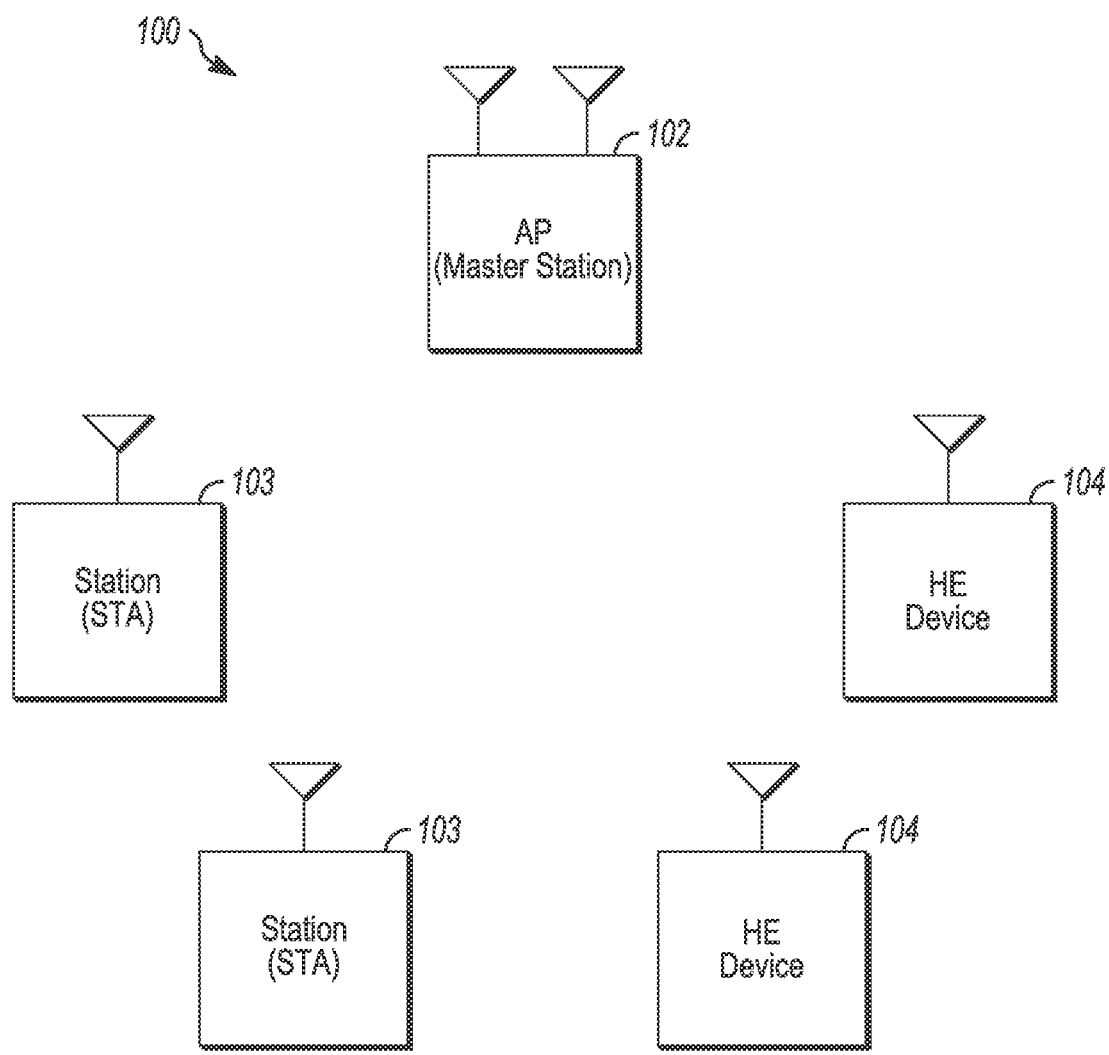
FIG. 1 illustrates a wireless network in accordance with some embodiments.

FIG. 1 illustrates a wireless network in accordance with some embodiments. In some embodiments, the network 100 may be a High Efficiency (HE) Wireless Local Area Network (WLAN) network. In some embodiments, the network 100 may be a WLAN or a Wi-Fi network. These embodiments are not limiting, however, as some embodiments of the network 100 may include a combination of such networks. That is, the network 100 may support MU operation (for example HE) devices in some cases, non MU operation devices in some cases, and a combination of MU operation devices and non MU operation devices in some cases. Accordingly, it is understood that although techniques described herein may refer to either a non MU operation device or to an MU operation device, such techniques may be applicable to both non MU operation devices and MU operation devices in some cases.

Referring to FIG. 1, the network 100 may include any or all of the components shown, and embodiments are not limited to the number of each component shown in FIG. 1. In some embodiments, the network 100 may include an access point (AP) 102 and may include any number (including zero) of stations (STAs) 103 and/or HE devices 104. In some embodiments, the AP 102 may be a master STA, may operate as a master STA and/or may be configured to operate as a master STA, although the scope of embodiments is not limited in this respect. In some embodiments, the AP 102 may receive and/or detect signals from one or more STAs 103, and may transmit signals to one or more STAs 103. These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to a master station are also not limiting. In some embodiments, a STA 103, an MU operation device (device capable of MU operation), an HE device 104 and/or other device may be configurable to operate as a master station. Accordingly, in such embodiments, operations that may be performed by the AP 102 as described herein may be performed by the STA 103, an MU operation device, an HE device 104 and/or other device that is configurable to operate as the master station.

In some embodiments, one or more of the STAs 103 may be legacy stations (for instance, a non MU operation device and/or device not capable of MU operation). These embodiments are not limiting, however, as the STAs 103 may be configured to operate as MU operation devices or operate as HE devices 104 or may support MU operation or may support HE operation, in some embodiments. The AP 102 may be arranged to communicate with the STAs 103 and/or the HE stations and/or the MU operation stations in accordance with one or more of the IEEE 802.11 standards, including 802.11ax and/or others. In accordance with some HE operation embodiments and/or MU operation embodiments, an access point (AP) may operate as a master station and may be arranged to contend for a wireless medium (e.g., during a contention period) to receive exclusive control of the medium for an 802.11 air access control period (i.e., a transmission opportunity (TXOP)). The AP 102 may, for example, transmit a master-sync or control transmission at the beginning of the 802.11 air access control period (including but not limited to an HE control period) to indicate, among other things, which MU operation stations and/or HE stations 104 are scheduled for communication during the 802.11 air access control period. During the 802.11 air access control period, the scheduled MU operation stations 104 may communicate with the AP 102 in accordance with a non-contention based multiple air access technique. This is unlike conventional Wi-Fi communications in which devices communicate in accordance with a contention-based communication technique, rather than a non-contention based multiple access technique. During the 802.11 air access control period, the AP 102 may communicate with HE stations 104 using one or more MU PPDUs. During the 802.11 air access control period. STAs 103 not operating as MU operation devices may refrain from communicating in some cases. In some embodiments, the master-sync transmission may be referred to as a control and schedule transmission.

In some embodiments, the multiple-air access technique used during the 802.11 air access control period may be a scheduled orthogonal frequency-division multiple access (OFDMA) technique, although this is not a requirement. In some embodiments, the multiple access technique may be a time-division multiple access (TDMA) technique or a frequency-division multiple access (FDMA) technique. In some embodiments, the multiple access technique may be a space-division multiple access (SDMA) technique including a multi-user (MU) multiple-input multiple-output (MIMO) (MU-MIMO) technique or combination of the above. These multiple-access techniques used during the 802.11 air access control period may be configured for uplink or downlink data communications.

The AP 102 may also communicate with STAs 103 and/or other legacy stations in accordance with legacy IEEE 802.11 communication techniques. In some embodiments, the AP 102 may also be configurable to communicate with the MU operation stations and/or HE stations 104 outside the 802.11 air access control period in accordance with legacy IEEE 802.11 communication techniques, although this is not a requirement.

In some embodiments, communications (including but not limited to the MU communications) during the control period may be configurable to use one of 1 MHz, 2 MHz, 2.5 MHz, 4 MHz, 5 MHz, 8 MHz, 10 MHz, 16 MHz, 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of a communications (including but not limited to the MU communications) may be configured for transmitting a number of spatial streams.

In some embodiments, MU techniques may be used, although the scope of embodiments is not limited in this respect. As an example, techniques included in 802.11ax standards and/or other standards may be used. In accordance with some embodiments, an AP 102, an STA 103, MU operation STAs and/or HE stations 104 may generate an MU packet in accordance with a short preamble format or a long preamble format. The MU packet may comprise a legacy signal field (L-SIG) followed by one or more MU signal fields (HE-SIG) and an MU long-training field (MU-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

It should also be noted that the AP 102 may operate as an STA 103, in some embodiments. Some techniques, operations and/or methods may be described herein in terms of communication between two STAs 103, but such descriptions are not limiting. Some or all of those techniques, operations and/or methods may be applicable to scenarios in which an STA 103 and an AP 102 communicate. In addition, some techniques, operations and/or methods may be described herein in terms of communication between an STA 103 and an AP 102, but such descriptions are not limiting. Some or all of those techniques, operations and/or methods may be applicable to scenarios in which two or more STAs 103 communicate.

In some embodiments, the STAs 103, AP 102, other mobile devices, other base stations and/or other devices may be configured to perform operations related to contention based communication. As an example, the communication between the STAs 103 and/or AP 102 and/or the communication between the STAs 103 may be performed in accordance with contention based techniques. In such cases, the STAs 103 and/or AP 102 may be arranged to contend for a wireless medium (e.g., during a contention period) to receive exclusive control of the medium for a transmission period. For instance, the transmission period may include a transmission opportunity (TXOP), which may be included in an 802.11 standard and/or other standard.

It should be noted that embodiments are not limited to usage of contention based techniques, however, as some communication (such as that between mobile devices and/or communication between a mobile device and a base station) may be performed in accordance with schedule based techniques. Some embodiments may include a combination of contention based techniques and schedule based techniques.

In some embodiments, the communication between mobile devices and/or between a mobile device and a base station may be performed in accordance with single carrier techniques. As an example, a protocol data unit (PDU) and/or other frame(s) may be modulated on a single carrier frequency in accordance with a single carrier modulation (SCM) technique.

In some embodiments, the communication between mobile devices and/or between a mobile device and a base station may be performed in accordance with any suitable multiple-access techniques and/or multiplexing techniques. Accordingly, one or more of orthogonal frequency division multiple access (OFDMA), orthogonal frequency division multiplexing (OFDM), code-division multiple access (CDMA), time-division multiple access (TDMA), frequency division multiplexing (FDMA), space-division multiple access (SDMA), multiple-input multiple-output (MIMO), multi-user (MU) multiple-input multiple-output (MIMO) (MU-MIMO) and/or other techniques may be employed in some embodiments.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
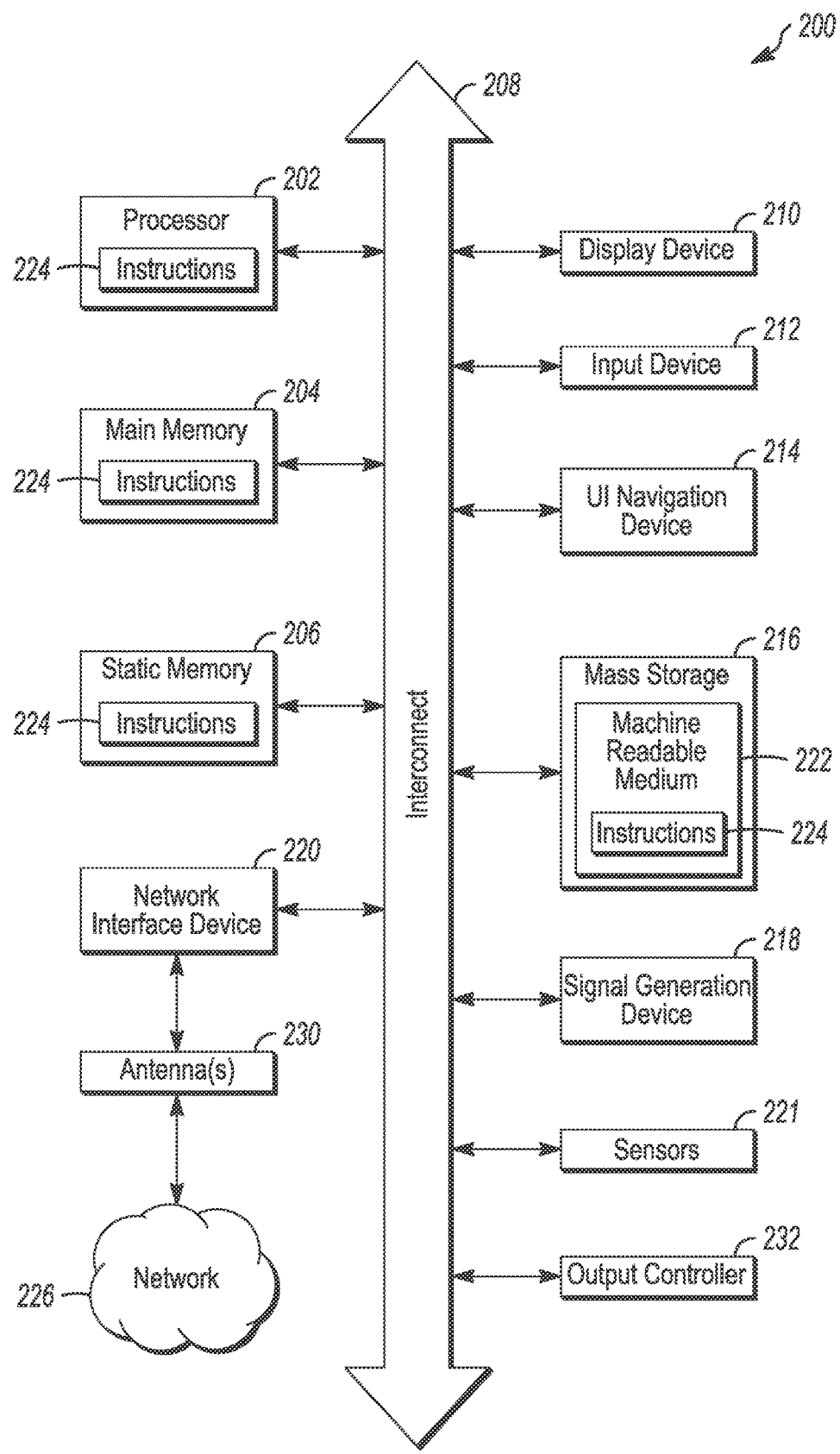
FIG. 2 illustrates an example machine in accordance with some embodiments.

FIG. 2 illustrates a block diagram of an example machine in accordance with some embodiments. The machine 200) is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine m peer-to-peer (P2P) (or other distributed) network environment. The machine 200 may be an AP 102, STA 103, User Equipment (UE), Evolved Node-B (eNB), mobile device, base station, personal computer (PC), a tablet PC, a set-top box (STB), a personal digital assistant (PDA), a mobile telephone, a smart phone, a web appliance, a network router, switch or bridge, an internet-of-things (IOT) device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display device 210, an alphanumeric input device 212 (e.g., a keyboard), and a user interface (UI) navigation device 214 (e.g., a mouse). In an example, the display device 210, input device 212 and UI navigation device 214 may be a touch screen display. The machine 200 may additionally include mass storage 216 (such as a storage device, drive unit and/or other), a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the mass storage 216 may constitute machine readable media. In some embodiments, the machine readable medium may be or may include a non-transitory computer-readable storage medium.

While the machine readable medium 222 is illustrated as a single medium the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
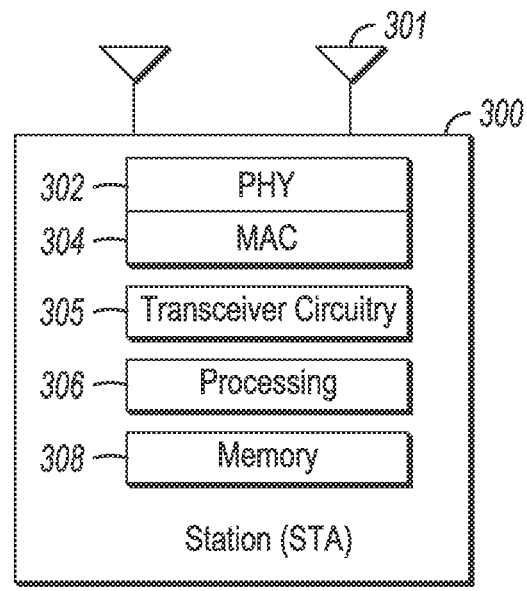
FIG. 3 illustrates a station (STA) in accordance with some embodiments and an access point (AP) in accordance with some embodiments.
Figure 3:
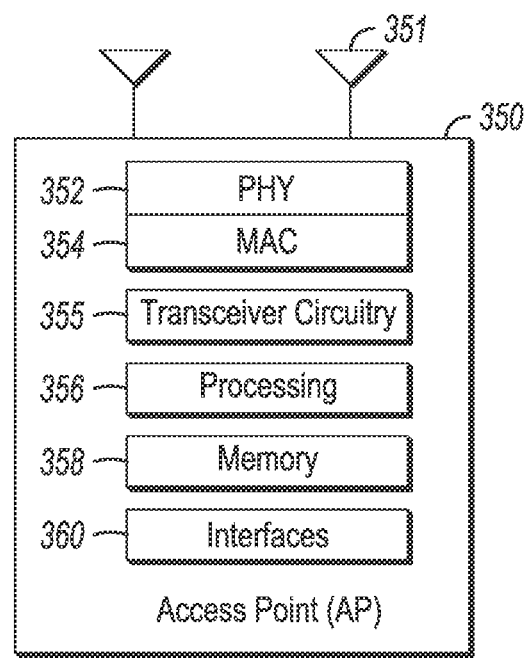

FIG. 3 illustrates a station (STA) in accordance with some embodiments and an access point (AP) in accordance with some embodiments. It should be noted that in some embodiments, an STA or other mobile device may include one or more components shown in any of FIG. 2, FIG. 3 (as in 300) or FIGS. 4-7. In some embodiments, the STA 300 may be suitable for use as an STA 103 as depicted in FIG. 1, although the scope of embodiments is not limited in this respect. It should also be noted that in some embodiments, an AP or other base station may include one or more components shown in any of FIG. 2, FIG. 3 (as in 350) or FIGS. 4-7. In some embodiments, the AP 350 may be suitable for use as an AP 102 as depicted in FIG. 1, although the scope of embodiments is not limited in this respect.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control (MAC) layer circuitry 304 for controlling access to the wireless medium.

The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control (MAC) layer circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured to communicate using OFDM and/or OFDMA communication signals over a multicarrier communication channel. In some embodiments, the AP 350 may be configured to communicate using OFDM and/or OFDMA communication signals over a multicarrier communication channel. Accordingly, in some cases, the STA 300 and/or AP 350 may be configured to receive signals in accordance with specific communication standards, such as the Institute of Electrical and Electronics Engineers (IEEE) standards including IEEE 802.11-2016, 802.11n-2009, 802.11ac-2013 standards, 802.11ax standards (and/or proposed standards), 802.11ay standards (and/or proposed standards) and/or other, although the scope of the embodiments is not limited in this respect as they may also be suitable to transmit and/or receive communications in accordance with other techniques and standards. In some other embodiments, the AP 350 and/or the STA 300 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that m some embodiments, an apparatus of the STA 300) may include various components of the STA 300 as shown in FIG. 3 and/or the example machine 200 as shown in FIG. 2 and/or various components shown in FIGS. 4-7. Accordingly, techniques and operations described herein that refer to the STA 300 (or 103) may be applicable to an apparatus of an STA, in some embodiments. It should also be noted that in some embodiments, an apparatus of the AP 350 may include various components of the AP 350 as shown in FIG. 3 and/or the example machine 200 as shown in FIG. 2 and/or various components shown in FIGS. 4-7. Accordingly, techniques and operations described herein that refer to the AP 350 (or 102) may be applicable to an apparatus of an AP, in some embodiments. In addition, an apparatus of a mobile device and/or base station may include one or more components shown in FIGS. 2-7, in some embodiments. Accordingly, techniques and operations described herein that refer to a mobile device and/or base station may be applicable to an apparatus of a mobile device and/or base station, in some embodiments.

Figure 4:
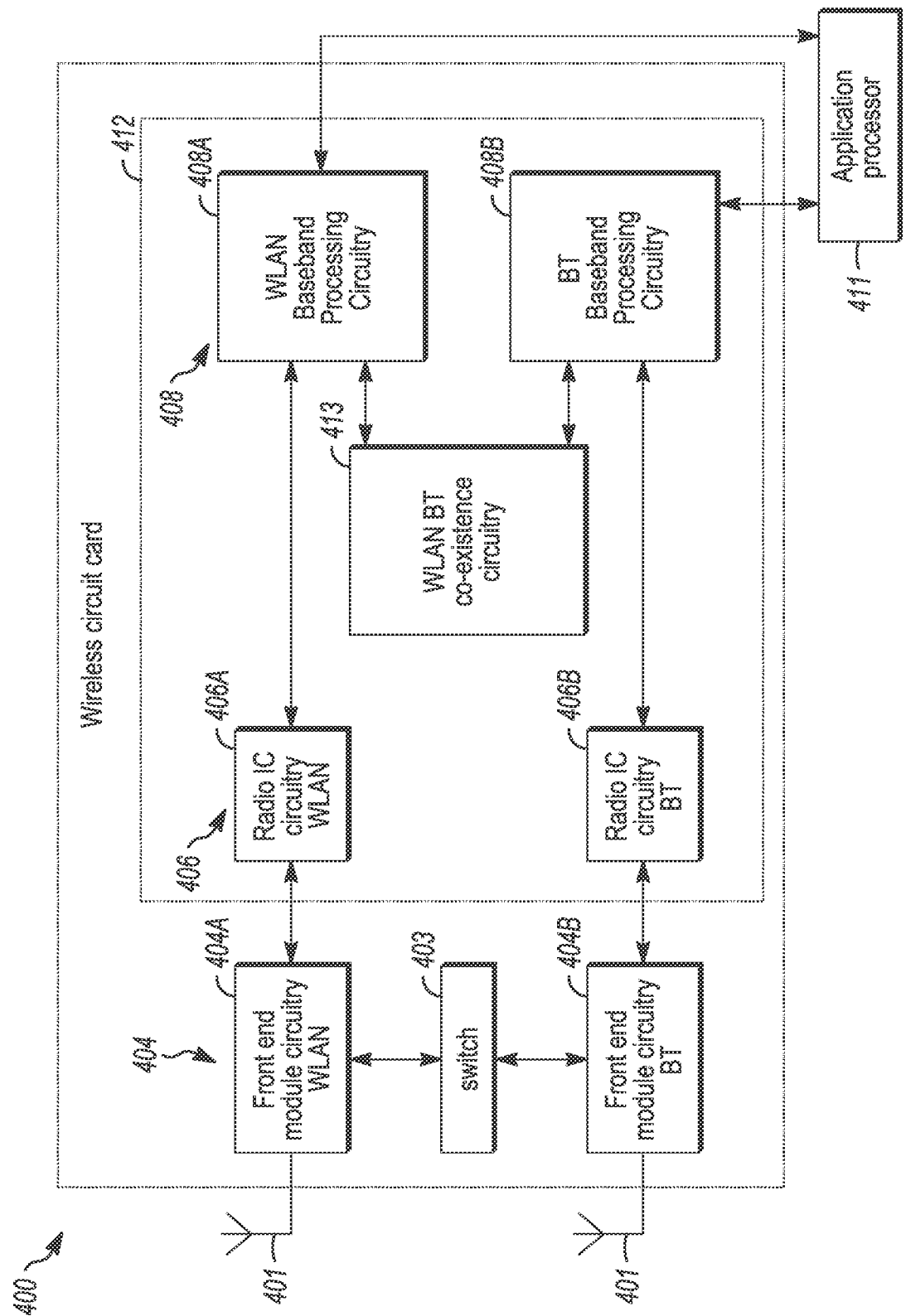
FIG. 4 is a block diagram of a radio architecture in accordance with some embodiments.

FIG. 4 is a block diagram of a radio architecture 400 in accordance with some embodiments. Radio architecture 400 may include radio front-end module (FEM) circuitry 404, radio IC circuitry 406 and baseband processing circuitry 408. Radio architecture 400 as shown includes both Wireless Local Area Network (WLAN) functionality and Bluetooth (BT) functionality although embodiments are not so limited. In this disclosure, "WLAN" and "Wi-Fi" are used interchangeably.

Figure 5:
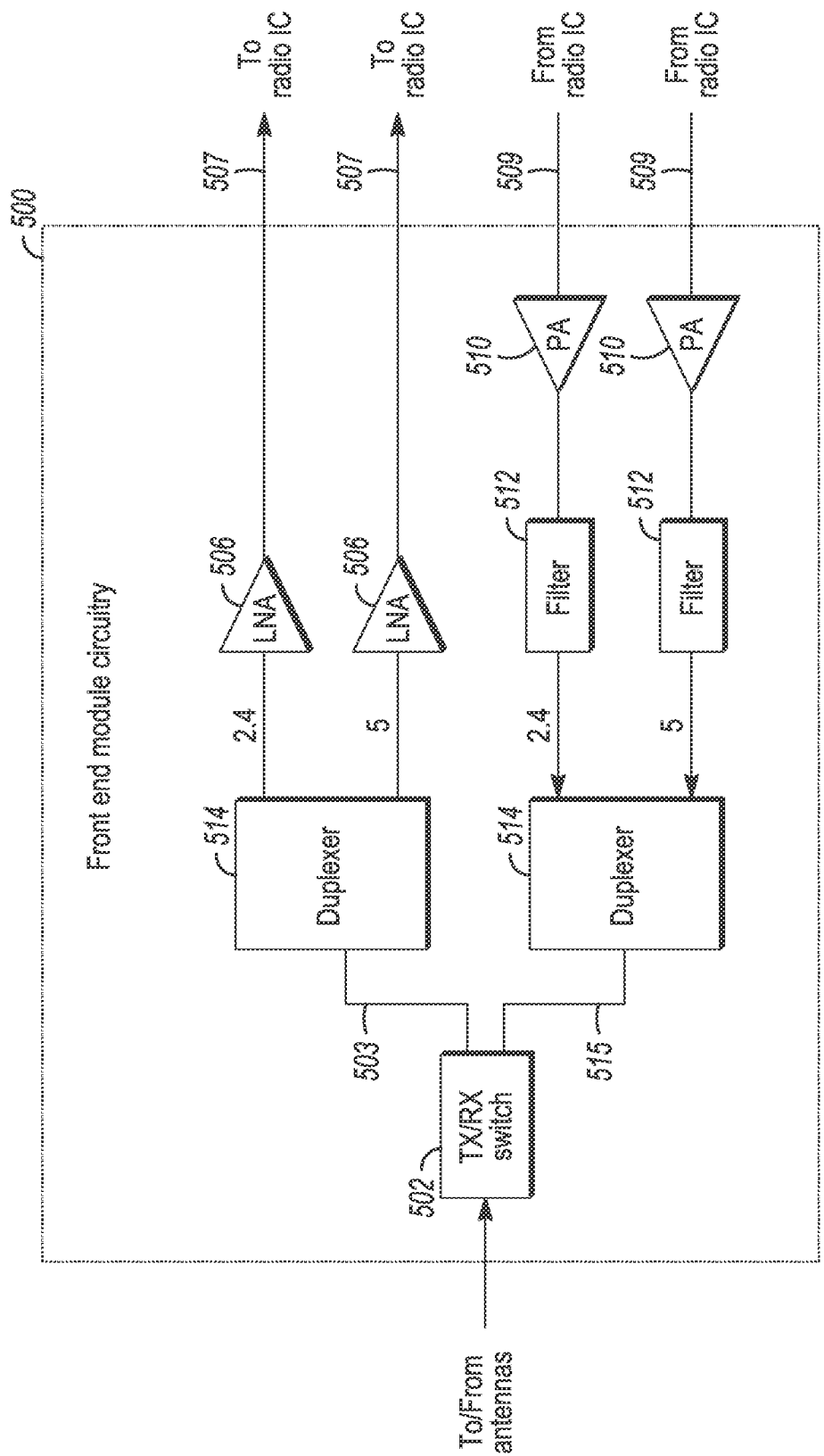
FIG. 5 illustrates a front-end module circuitry for use in the radio architecture of FIG. 4 in accordance with some embodiments.
Figure 6:
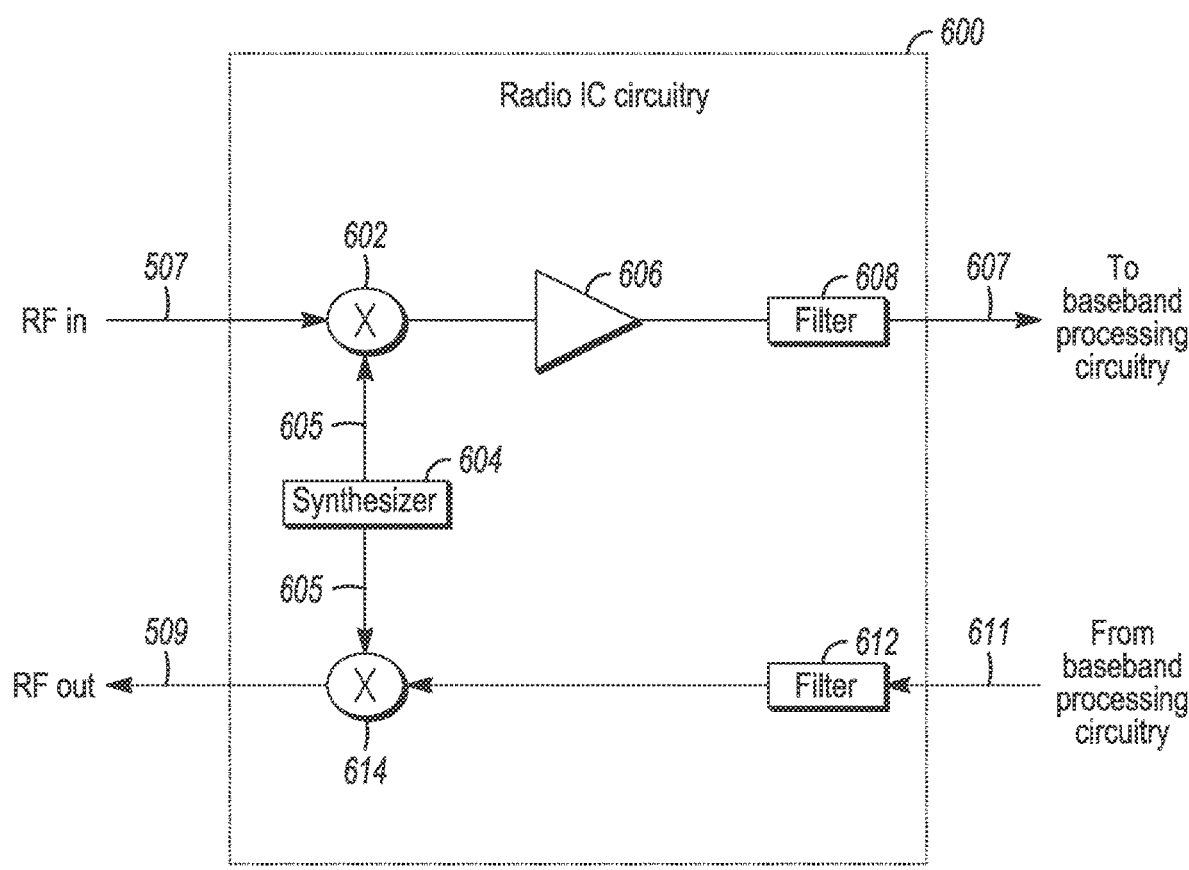
FIG. 6 illustrates a radio IC circuitry for use in the radio architecture of FIG. 4 in accordance with some embodiments.
Figure 7:
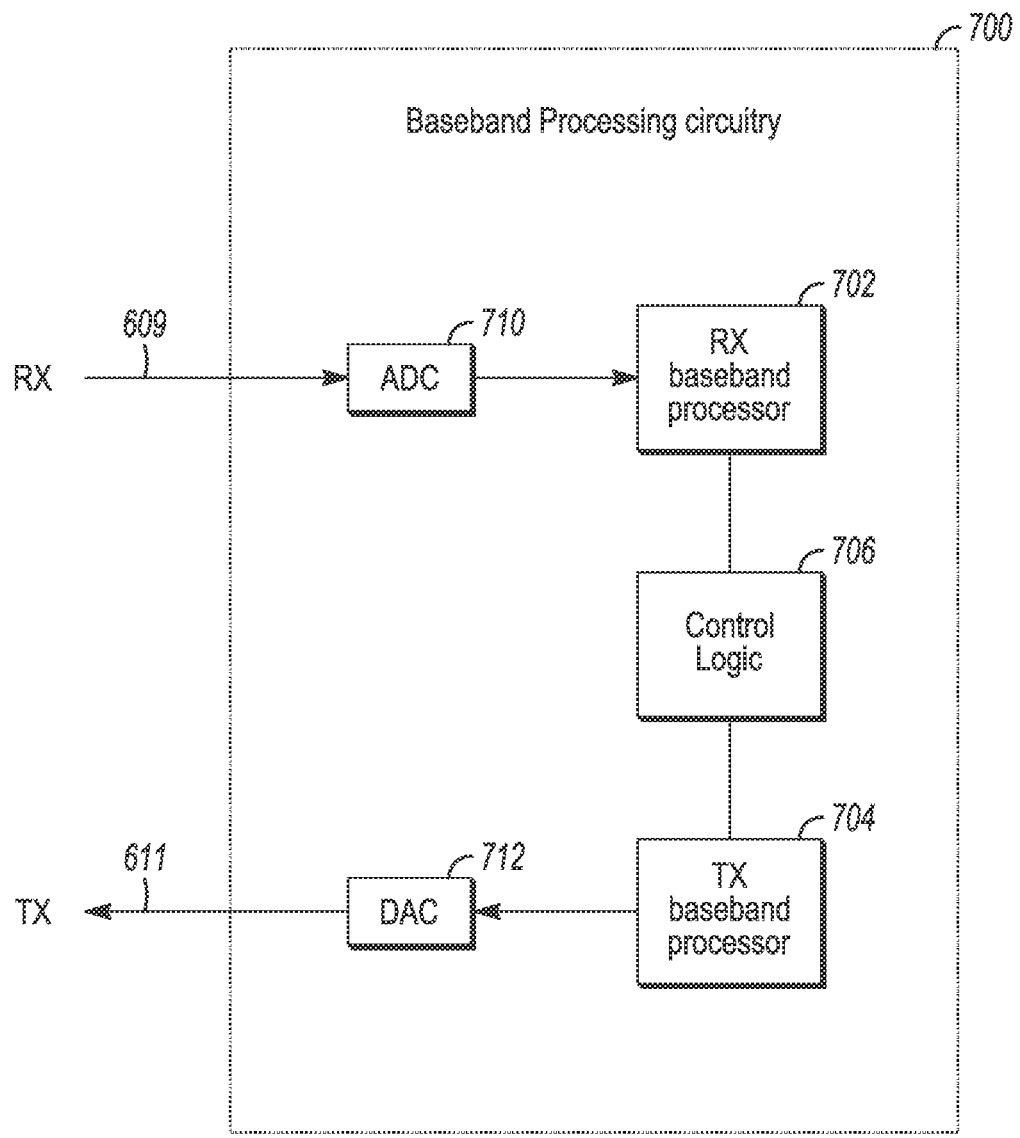
FIG. 7 illustrates a baseband processing circuitry for use in the radio architecture of FIG. 4 in accordance with some embodiments.

It should be noted that the radio architecture 400 and components shown in FIGS. 5-7 support WLAN and BT, but embodiments are not limited to WLAN or BT. In some embodiments, two technologies supported by the radio architecture 400 may or may not include WLAN or BT. Other technologies may be supported. In some embodiments, WLAN and a second technology may be supported. In some embodiments, BT and a second technology may be supported. In some embodiments, two technologies other than WLAN and BT may be supported. In addition, the radio architecture 400) may be extended to support more than two protocols, technologies and/or standards, in some embodiments. Embodiments are also not limited to the frequencies illustrated in FIGS. 4-7.

It should also be noted that variations of the radio architecture 400 are possible. Although discussion herein may refer to a dual mode arrangement in which two technologies (WLAN and BT in this example) are supported, it is understood that single mode arrangements are also possible. In some embodiments, the radio architecture 400 may not necessarily support BT operation or may not necessarily support BT operation in the arrangement shown in FIG. 4. For instance, the radio architecture 400 may include components 404A, 406A, and 408A, but may not necessarily include components such as 404B, 406, 406B. 408B. 403 and/or 413. Accordingly, the dual mode arrangement (for WLAN and BT) may be modified, in some embodiments, to support WLAN without support of BT or other protocols.

FEM circuitry 404 may include a WLAN or Wi-Fi FEM circuitry 404A and a Bluetooth (BT) FEM circuitry 404B. The WLAN FEM circuitry 404A may include a receive signal path comprising circuitry configured to operate on WLAN RF signals received from one or more antennas 401, to amplify the received signals and to provide the amplified versions of the received signals to the WLAN radio IC circuitry 406A for further processing. The BT FEM circuitry 404B may include a receive signal path which may include circuitry configured to operate on BT RF signals received from one or more antennas 401, to amplify the received signals and to provide the amplified versions of the received signals to the BT radio IC circuitry 406B for further processing. FEM circuitry 404A may also include a transmit signal path which may include circuitry configured to amplify WLAN signals provided by the radio IC circuitry 406A for wireless transmission by one or more of the antennas 401. In addition, FEM circuitry 404B may also include a transmit signal path which may include circuitry configured to amplify BT signals provided by the radio IC circuitry 406b for wireless transmission by the one or more antennas. In the embodiment of FIG. 4, although FEM 404A and FEM 404B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 406 as shown may include WLAN radio IC circuitry 406A and BT radio IC circuitry 406B. The WLAN radio IC circuitry 406A may include a receive signal path which may include circuitry to down-convert WLAN RF signals received from the FEM circuitry 404A and provide baseband signals to WLAN baseband processing circuitry 408a. BT radio IC circuitry 406B may in turn include a receive signal path which may include circuitry to down-convert BT RF signals received from the FEM circuitry 404B and provide baseband signals to BT baseband processing circuitry 408B. WLAN radio IC circuitry 406A may also include a transmit signal path which may include circuitry to up-convert WLAN baseband signals provided by the WLAN baseband processing circuitry 408A and provide WLAN RF output signals to the FEM circuitry 404A for subsequent wireless transmission by the one or more antennas 401. BT radio IC circuitry 406B may also include a transmit signal path which may include circuitry to up-convert BT baseband signals provided by the BT baseband processing circuitry 408B and provide BT RF output signals to the FEM circuitry 404B for subsequent wireless transmission by the one or more antennas 401. In the embodiment of FIG. 4, although radio IC circuitries 406A and 406B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 408 may include a WLAN baseband processing circuitry 408A and a BT baseband processing circuitry 408B. The WLAN baseband processing circuitry 408A may include a memory, such as, for example, a set of RAM arrays in a Fast Fourier Transform or Inverse Fast Fourier Transform block (not shown) of the WLAN baseband processing circuitry 408A. Each of the WLAN baseband circuitry 408A and the BT baseband circuitry 408B may further include one or more processors and control logic to process the signals received from the corresponding WLAN or BT receive signal path of the radio IC circuitry 406, and to also generate corresponding WLAN or BT baseband signals for the transmit signal path of the radio IC circuitry 406. Each of the baseband processing circuitries 408A and 408B may further include physical layer (PHY) and medium access control layer (MAC) circuitry, and may further interface with application processor 411 for generation and processing of the baseband signals and for controlling operations of the radio IC circuitry 406.

Referring still to FIG. 4, according to the shown embodiment, WLAN-BT coexistence circuitry 413 may include logic providing an interface between the WLAN baseband circuitry 408A and the BT baseband circuitry 408B to enable use cases requiring WLAN and BT coexistence. In addition, a switch 403 may be provided between the WLAN FEM circuitry 404A and the BT FEM circuitry 404B to allow switching between the WLAN and BT radios according to application needs. In addition, although the antennas 401 are depicted as being respectively connected to the WLAN FEM circuitry 404A and the BT FEM circuitry 404B, embodiments include within their scope the sharing of one or more antennas as between the WLAN and BT FEMs, or the provision of more than one antenna connected to each of FEM 404A or 404B.

In some embodiments, the front-end module circuitry 404, the radio IC circuitry 406, and baseband processing circuitry 408 may be provided on a single radio card, such as wireless radio card 402. In some other embodiments, the one or more antennas 401, the FEM circuitry 404 and the radio IC circuitry 406 may be provided on a single radio card. In some other embodiments, the radio IC circuitry 406 and the baseband processing circuitry 408 may be provided on a single chip or integrated circuit (IC), such as IC 412.

In some embodiments, the wireless radio card 402 may include a WLAN radio card and may be configured for Wi-Fi communications, although the scope of the embodiments is not limited in this respect. In some of these embodiments, the radio architecture 400 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 400 may be part of a Wi-Fi communication station (STA) such as a wireless access point (AP), a base station or a mobile device including a Wi-Fi device. In some of these embodiments, radio architecture 400 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 400 may also be suitable to transmit and/or receive communications in accordance with other techniques and standards.

In some embodiments, the radio architecture 400 may be configured for high-efficiency (HE) Wi-Fi (HEW) communications in accordance with the IEEE 802.11ax standard. In these embodiments, the radio architecture 400 may be configured to communicate in accordance with an OFDMA technique, although the scope of the embodiments is not limited in this respect.

In some other embodiments, the radio architecture 400 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 4, the BT baseband circuitry 408B may be compliant with a Bluetooth (BT) connectivity standard such as Bluetooth. Bluetooth 4.0 or Bluetooth 5.0, or any other iteration of the Bluetooth Standard. In embodiments that include BT functionality as shown for example in FIG. 4, the radio architecture 400 may be configured to establish a BT synchronous connection oriented (SCO) link and/or a BT low energy (BT LE) link. In some of the embodiments that include functionality, the radio architecture 400 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 4, the functions of a BT radio card and WLAN radio card may be combined on a single wireless radio card, such as single wireless radio card 402, although embodiments are not so limited, and include within their scope discrete WLAN and BT radio cards.

In some embodiments, the radio-architecture 400 may include other radio cards, such as a cellular radio card configured for cellular (e.g., 3GPP such as LTE, LTE-Advanced or 5G communications).

In some IEEE 802.11 embodiments, the radio architecture 400 may be configured for communication over various channel bandwidths including bandwidths having center frequencies of about 900 MHz, 2.4 GHz, 5 GHz. In some embodiments, the bandwidths may be about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. In some embodiments, the bandwidths may be about 2.16 GHz, 4.32 GHz, 6.48 GHz, 8.72 GHz and/or other suitable value. The scope of the embodiments is not limited with respect to the above center frequencies or bandwidths, however.

FIG. 5 illustrates FEM circuitry 500 in accordance with some embodiments. The FEM circuitry 500 is one example of circuitry that may be suitable for use as the WLAN and/or BT FEM circuitry 404A/404B (FIG. 4), although other circuitry configurations may also be suitable. In some embodiments, one or more components (including but not limited to one or more components described herein related to the FEM circuitry 500) may be integrated as part of a radio IC.

In some embodiments, the FEM circuitry 500 may include a TX/RX switch 502 to switch between transmit mode and receive mode operation. The FEM circuitry 500 may include a receive signal path and a transmit signal path. The receive signal path of the FEM circuitry 500 may include a low-noise amplifier (LNA) 506 to amplify received RF signals 503 and provide the amplified received RF signals 507 as an output (e.g., to the radio IC circuitry 406 (FIG. 4)). The transmit signal path of the circuitry 500 may include a power amplifier (PA) 510 to amplify input RF signals 509 (e.g., provided by the radio IC circuitry 406), and one or more filters 512, such as band-pass filters (BPFs), low-pass filters (LPFs) or other types of filters, to generate RF signals 515 for subsequent transmission (e.g., by one or more of the antennas 401 (FIG. 4)).

In some dual-mode embodiments for Wi-Fi communication, the FEM circuitry 500 may be configured to operate in either the 2.4 GHz frequency spectrum or the 5 GHz frequency spectrum. In these embodiments, the receive signal path of the FEM circuitry 500 may include a receive signal path duplexer 504 to separate the signals from each spectrum as well as provide a separate LNA 506 for each spectrum as shown. In these embodiments, the transmit signal path of the FEM circuitry 500 may also include a power amplifier 510 and a filter 512, such as a BPF, a LPF or another type of filter for each frequency spectrum and a transmit signal path duplexer 514 to provide the signals of one of the different spectrums onto a single transmit path for subsequent transmission by the one or more of the antennas 401 (FIG. 4). In some embodiments, BT communications may utilize the 2.4 GHZ signal paths and may utilize the same FEM circuitry 500 as the one used for WLAN communications.

FIG. 6 illustrates radio IC circuitry 600 in accordance with some embodiments. The radio IC circuitry 600 is one example of circuitry that may be suitable for use as the WLAN or BT radio IC circuitry 406A/406B (FIG. 4), although other circuitry configurations may also be suitable.

In some embodiments, the radio IC circuitry 600 may include a receive signal path and a transmit signal path. The receive signal path of the radio IC circuitry 600 may include at least mixer circuitry 602, such as, for example, down-conversion mixer circuitry, amplifier circuitry 606 and filter circuitry 608. The transmit signal path of the radio IC circuitry 600 may include at least filter circuitry 612 and mixer circuitry 614, such as, for example, up-conversion mixer circuitry. Radio IC circuitry 600 may also include synthesizer circuitry 604 for synthesizing a frequency 605 for use by the mixer circuitry 602 and the mixer circuitry 614. The mixer circuitry 602 and/or 614 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 6 illustrates only a simplified version of a radio IC circuitry, and may include, although not shown, embodiments where each of the depicted circuitries may include more than one component. For instance, mixer circuitry 602 and/or 614 may each include one or more mixers, and filter circuitous 608 and/or 612 may each include one or more filters, such as one or more BPFs and/or LPFs according to application needs. For example, when mixer circuitries are of the direct-conversion type, they may each include two or more mixers.

In some embodiments, mixer circuitry 602 may be configured to down-convert RF signals 507 received from the FEM circuitry 404 (FIG. 4) based on the synthesized frequency 605 provided by synthesizer circuitry 604. The amplifier circuitry 606 may be configured to amplify, the down-converted signals and the filter circuitry 608 may include a LPF configured to remove unwanted signals from the down-converted signals to generate output baseband signals 607. Output baseband signals 607 may be provided to the baseband processing circuitry 408 (FIG. 4) for further processing. In some embodiments, the output baseband signals 607 may be zero-frequency baseband signals, although this is not a requirement. In some embodiments, mixer circuitry 602 may comprise passive mixers, although the scope of the embodiments is not limited in this respect.

In some embodiments, the mixer circuitry 614 may be configured to up-convert input baseband signals 611 based on the synthesized frequency 605 provided by the synthesizer circuitry 604 to generate RF output signals 509 for the FEM circuitry 404. The baseband signals 611 may be provided by the baseband processing circuitry 408 and may be filtered by filter circuitry 612. The filter circuitry 612 may include a LPF or a BPF, although the scope of the embodiments is not limited in this respect.

In some embodiments, the mixer circuitry 602 and the mixer circuitry 614 may each include two or more mixers and may be arranged for quadrature down-conversion and/or up-conversion respectively with the help of synthesizer 604. In some embodiments, the mixer circuitry 602 and the mixer circuitry 614 may each include two or more mixers each configured for image rejection (e.g., Hartley image rejection). In some embodiments, the mixer circuitry 602 and the mixer circuitry 614 may be arranged for direct down-conversion and/or direct up-conversion, respectively. In some embodiments, the mixer circuitry 602 and the mixer circuitry 614 may be configured for super-heterodyne operation, although this is not a requirement.

Mixer circuitry 602 may comprise, according to one embodiment: quadrature passive mixers (e.g., for the in-phase (I) and quadrature phase (Q) paths). In such an embodiment, RF input signal 507 from FIG. 6 may be down-converted to provide I and Q baseband output signals to be sent to the baseband processor.

Quadrature passive mixers may be driven by zero and ninety degree time-varying LO switching signals provided by a quadrature circuitry which may be configured to receive a LO frequency ($f_{LO}$) from a local oscillator or a synthesizer, such as LO frequency 605 of synthesizer 604 (FIG. 6). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 507 (FIG. 5) may comprise a balanced signal, although the scope of the embodiments is not limited in this respect. The I and Q baseband output signals may be provided to low-nose amplifier, such as amplifier circuitry 606 (FIG. 6) or to filter circuitry 608 (FIG. 6).

In some embodiments, the output baseband signals 607 and the input baseband signals 611 may be analog baseband signals, although the scope of the embodiments is not limited in this respect. In some alternate embodiments, the output baseband signals 607 and the input baseband signals 611 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 604 may be a fractional-N synthesizer or a fractional N/N+1 synthesizer, although the scope of the embodiments is not limited in this respect as other types of frequency synthesizers may be suitable. For example, synthesizer circuitry 604 may be a delta-sigma synthesizer, a frequency multiplier, or a synthesizer comprising a phase-locked loop with a frequency divider. According to some embodiments, the synthesizer circuitry 604 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 604 may be provided by a voltage controlled oscillator (VCO), although that is not a requirement. A divider control input may further be provided by either the baseband processing circuitry 408 (FIG. 4) or the application processor 411 (FIG. 4) depending on the desired output frequency 605. In some embodiments, a divider control input (e.g., N) may be determined from a look-up table (e.g., within a Wi-Fi card) based on a channel number and a channel center frequency as determined or indicated by the application processor 411.

In some embodiments, synthesizer circuitry 604 may be configured to generate a carrier frequency as the output frequency 605, while in other embodiments, the output frequency 605 may be a fraction of the carrier frequency (e.g., one-half the carrier frequency, one-third the carrier frequency). In some embodiments, the output frequency 605 may be a LO frequency ($f_{LO}$).

FIG. 7 illustrates a functional block diagram of baseband processing circuitry 700 in accordance with some embodiments. The baseband processing circuitry 700 is one example of circuitry that may be suitable for use as the baseband processing circuitry 408 (FIG. 4), although other circuitry configurations may also be suitable. The baseband processing circuitry 700 may include a receive baseband processor (RX BBP) 702 for processing receive baseband signals 609 provided by the radio IC circuitry 406 (FIG. 4) and a transmit baseband processor (TX BBP) 704 for generating transmit baseband signals 611 for the radio IC circuitry 406. The baseband processing circuitry 700 may also include control logic 706 for coordinating the operations of the baseband processing circuitry 700.

In some embodiments (e.g., when analog baseband signals are exchanged between the baseband processing circuitry 700 and the radio IC circuitry 406), the baseband processing circuitry 700 may include ADC 710 to convert analog baseband signals received from the radio IC circuitry 406 to digital baseband signals for processing by the RX BBP 702. In these embodiments, the baseband processing circuitry 700 may also include DAC 712 to convert digital baseband signals from the TX BBP 704 to analog baseband signals.

In some embodiments that communicate OFDM signals or OFDMA signals, such as through baseband processor 408A, the transmit baseband processor 704 may be configured to generate OFDM or OFDMA signals as appropriate for transmission by performing an inverse fast Fourier transform (IFFT). The receive baseband processor 702 may be configured to process received OFDM signals or OFDMA signals by performing an FFT. In some embodiments, the receive baseband processor 702 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 4, in some embodiments, the antennas 401 (FIG. 4) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 401 may each include a set of phased-array antennas, although embodiments are not so limited.

Although the radio-architecture 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with some embodiments, the AP 102 may contend for a transmission opportunity (TXOP) to obtain access to an operating channel. The AP 102 may transmit, in the operating channel during the TXOP, a downlink physical layer convergence procedure protocol data unit (PPDU) that includes a used basic service set (BSS) color that indicates communication between the AP 102 and one or more associated stations (STAs) 103. The AP 102 may detect another PPDU from an STA 103 that is unassociated with the AP 102. The AP 102 may, if a header portion of the detected PPDU includes the used BSS color: determine an alternate BSS color to be used to indicate the communication between the AP 102 and the associated STAs 103; and transmit a color switch announcement (CSA) element that indicates the alternate BSS color. The CSA element may be configurable to further indicate whether the AP 102 and the associated STAs 103 are to switch from the operating channel to an alternate channel for the communication between the AP 102 and the associated STAs 103. These embodiments are described in more detail below.

It should be noted that references herein to a "used BSS color" and/or "alternate BSS color" are not limiting. In some embodiments described herein, a "first BSS color" may be used instead of a "used BSS color." and a "second BSS color" may be used instead of an "alternate BSS color."

It should be noted that references herein to an "operating channel" and/or "alternate channel" are not limiting. In some embodiments described herein, a "first channel" may be used instead of an "operating channel," and a "second channel" may be used instead of an "alternate channel."

Figure 8:
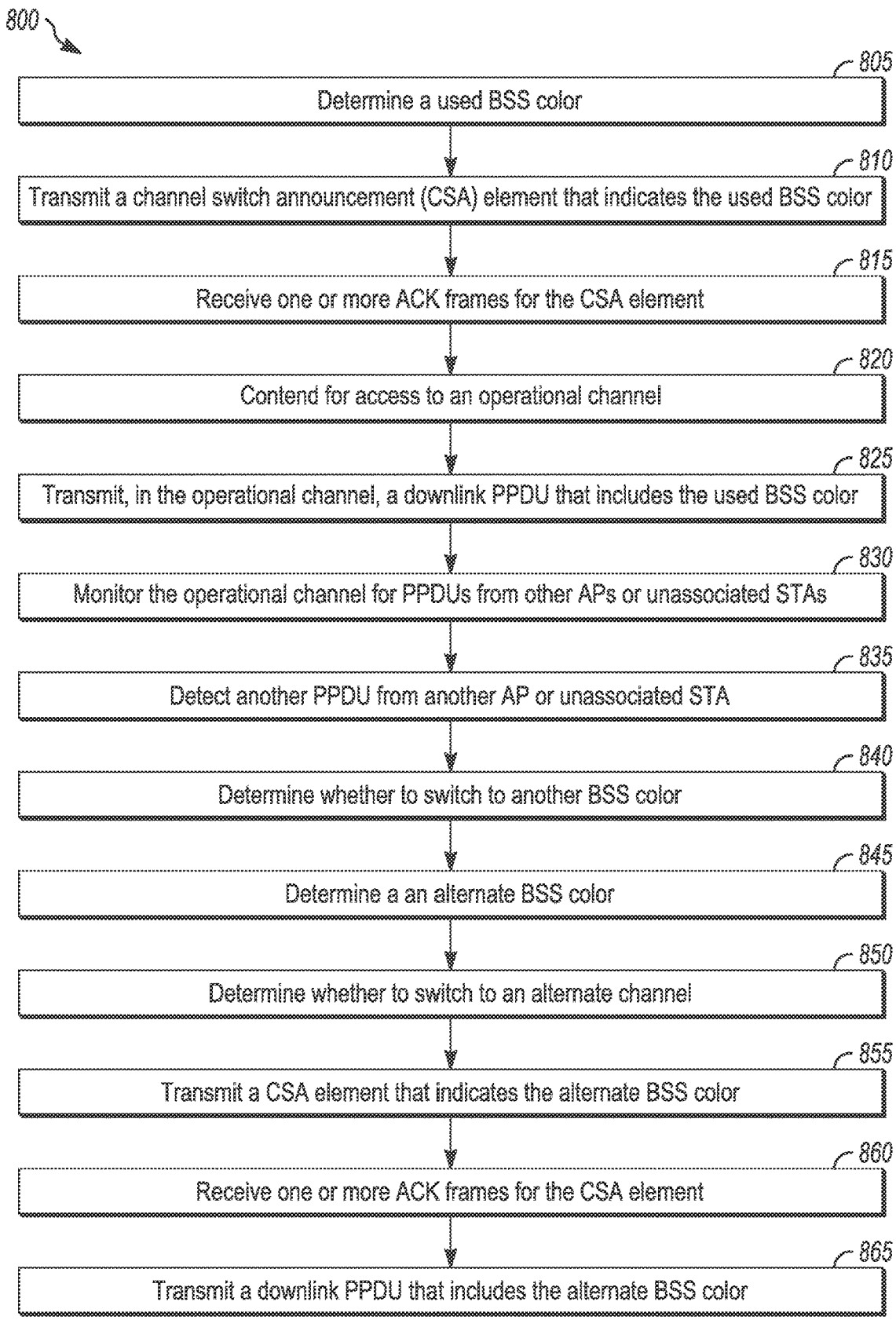
FIG. 8 illustrates the operation of a method of communication in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. Some embodiments of the method 800 may not necessarily include all operations shown in FIG. 8. In addition, embodiments of the method 800 are not necessarily limited to the chronological order that is shown in FIG. 8. In describing the method 800, reference may be made to FIGS. 1-7 and 9-11, although it is understood that the method 800 may be practiced with any other suitable systems, interfaces and components.

In addition, the method 800 and other methods described herein may refer to STAs 103 or APs 102 operating in accordance with an 802.11 standard, protocol and/or specification and/or WLAN standard, protocol and/or specification, in some cases. Embodiments of those methods are not limited to just those STAs 103 or APs 102 and may also be practiced on other devices, such as a User Equipment (UE), an Evolved Node-B (eNB) and/or other device. In addition, the method 800 and other methods described herein may be practiced by wireless devices configured to operate in other suitable types of wireless communication systems, including systems configured to operate according to various Third Generation Partnership Protocol (3GPP) standards, including but not limited to Long Term Evolution (LTE). The method 800 may also be practiced by an apparatus of an STA 103 and/or AP 102 and/or other device, in some embodiments.

It should also be noted that embodiments are not limited by references herein (such as in descriptions of the methods 800 and 1100 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

In addition, references to an AP 102 are not limiting. One or more operations, techniques and/or methods described herein may be applicable to a BSS, in some embodiments.

At operation 805, the AP 102 may determine a used basic service set (BSS) color. At operation 810, the AP 102 may transmit a color switch announcement (CSA) element that indicates the used BSS color. In some embodiments, the AP 102 may transmit the CSA as a response to a request from the STA 103 (including but not limited to a probe request). At operation 815, the AP 102 may receive one or more ACK frames for the CSA element. Embodiments are not limited to ACK frames, however. Other frames and/or messages may be used to acknowledge and/or indicate reception of the CSA element. It should be noted that the ACK frame(s) may be sent from the STA(s) 103 if the AP 102 transmits the CSA in accordance with a unicast technique. However, the STA(s) 103 may not necessarily send the ACK frame(s) if the AP 102 transmits the CSA in accordance with a broadcast technique.

In some embodiments, the used BSS color may identify communication between the AP 102 and one or more STAs 103 associated with the AP 102. In some cases, such communication may be performed between the AP 102 and one or more STAs 103. In some cases, such communication may also be performed between two or more STAs 103.

In some embodiments, the used BSS color may be a number that may be represented by a number of bits. For instance, a 6-bit number may be used. Embodiments are not limited to 6 bits, however, as any suitable size may be used for the used BSS color. In some embodiments, the used BSS color may be selected from candidate BSS colors. For instance, the candidate BSS colors may include some or all numbers that may be represented by a number of bits. In a non-limiting example, a subset of the 64 possible 6-bit numbers may be used. In another non-limiting example, all of the 64 possible 6-bit numbers may be used.

The AP 102 may communicate the used BSS color to one or more STAs 103 that are associated with the AP 102. In some embodiments, a CSA element (to be described below) may be used. In addition, one or more frames exchanged between the AP 102 and the associated STAs 103 may be used to communicate the used BSS color. Such frames may be exchanged as part of a process that may be the same as or similar to a channel switch procedure (which may be included in a WLAN standard and/or other standard, in some cases).

In some embodiments, the AP 102 and STAs 103 may include the used BSS color (the one selected by the AP 102) m physical layer convergence procedure protocol data units (PPDUs) to indicate that the PPDUs are transmitted as part of the communication between the AP 102 and the associated STA(s) 103. For instance, the used BSS color may be included in a header portion of a PPDU.

In some embodiments, a device (AP 102 and/or STA 103) may detect a PPDU and may determine, based on a BSS color field included in a header of the PPDU, whether the PPDU originated from the AP 102 or from one of the associated STAs 103. For instance, the device (AP 102 and/or STA 103) may compare a value included in the BSS color field with the used BSS color. In some cases, the device may determine whether the PPDU was transmitted (by the AP 102 or by one of the associated STAs 103) as part of the communication identified by the used BSS color.

At operation 820, the AP 102 may contend for a transmission opportunity (TXOP) to obtain access to an operating channel. In some embodiments, the AP 102 may contend for access to channel resources (such as the operating channel). The AP 102 may contend for a TXOP during which the AP 102 is to control access to the channel resources. In some embodiments, the AP 102 may contend for a wireless medium during a contention period to receive exclusive control of the medium during a period, including but not limited to a TXOP and/or HE control period. The AP 102 may transmit, receive and/or schedule one or more frames and/or signals during the period. However, it should be noted that embodiments are not limited to scheduled transmission/reception or to transmission/reception in accordance with the exclusive control of the medium. Accordingly, a PPDU and/or other frame may be transmitted/received in contention-based scenarios and/or other scenarios, in some embodiments. Any suitable contention methods, operations and/or techniques may be used, which may or may not be part of a standard. It should be noted that embodiments are not limited to contention based transmissions, however.

In a non-limiting example, one or more contention methods, operations and/or techniques of an 802.11 standard/protocol and/or WLAN standard/protocol may be used. In another non-limiting example, the AP 102 may contend for access to the channel resources multiple times. For instance, a first contention may be performed before a first transmission and a second contention may be performed before a second transmission. In another non-limiting example, the AP 102 may contend for a TXOP multiple times. For instance, the AP 102 may transmit, receive and/or schedule one or more elements (frames, signals and/or other) during each of multiple TXOPs.

At operation 825, the AP 102 may transmit, in the operating channel, a downlink PPDU that includes the used BSS color. In some embodiments, the AP 102 may transmit, in the operating channel during the TXOP, a downlink PPDU that includes the used BSS color. The used BSS color may indicate communication between the AP 102 and one or more associated STAs 103. In a non-limiting example, the used BSS color may be included in a BSS color field of the downlink PPDU. The BSS color field may be in a header portion of the downlink PPDU, although the scope of embodiments is not limited in this respect. It should be noted that the selected BSS color may be used may be used in all PPDUs transmitted in the TXOP in some embodiments, although the scope of embodiments is not limited in this respect.

In some embodiments, the downlink PPDU may be transmitted to one or more STAs 103. A broadcast transmission, a multicast transmission to multiple STAs 103 and/or unicast transmission to an STA 103 may be used.

At operation 830, the AP 102 may monitor the operating channel for PPDUs. At operation 835, the AP 102 may detect another PPDU from another AP 102 or unassociated STA 103. As part of operation 830 and/or 835, the AP 102 may perform one or more of: determine a value in a BSS color field of a detected PPDU, determine whether the value matches the used BSS color and/or other operation(s).

In some embodiments, the AP 102 may also receive a report from an STA 103 that includes a BSS color that the STA 103 requests to be used. For instance, a particular BSS color may be received from other STA(s) 103 and/or AP(s) 102 that are not connected to the AP 102. In some embodiments, the BSS color may be communicated to the AP 102 by a network component.

In some embodiments, a switch may be from the operating channel to the same channel using a different BSS color.

In some embodiments, the AP 102 may monitor for PPDUs from devices other than associated STAs 103. In a non-limiting example, the AP 102 may monitor the operating channel for PPDUs from unassociated STAs 103 (that is, unassociated with the AP 102). In another non-limiting example, the AP 102 may monitor the operating channel for PPDUs from other APs 102 and/or unassociated STAs 103. In another non-limiting example, the AP 102 may monitor the operating channel for overlapping basic service set (OBSS) PPDUs. Such OBSS PPDUs may include one or more of: PPDUs from other APs 102, PPDUs from STAs 103 unassociated with the AP 102 and/or other PPDUs. In another non-limiting example, the AP 102 may detect one or more PPDUs in the operating channel from one or more overlapping basic service set (OBSS) APs 102 or OBSS STAs 103.

At operation 840, the AP 102 may determine whether to switch to another BSS color. At operation 845, the AP 102 may determine an alternate color. In some embodiments, the AP 102 may determine an alternate BSS color to be used to indicate the communication between the AP 102 and the associated STAs 103.

It should be noted that, in some embodiments, performance of one or more of operations 840-865 may be based on one or more results of one or more other operations. In some cases, all of operations 840-865 may not necessarily be performed. For instance, one or more of operations 845-865 may be performed if it is determined (at operation 840) that the AP 102 and associated STAs 103 are to switch to another color. Such operations may not necessarily be performed if it is determined that the AP 102 and associated STAs 103 are not to switch to another color.

In a non-limiting example, the AP 102 may determine that the AP 102 and the associated STAs 103 are to switch to another color if a header portion of a detected PPDU (such as a PPDU from another AP 102 and/or STA 103 unassociated with the AP 102) includes the used BSS color. This example is not limiting, as any suitable technique(s) may be used, by the AP 102, to determine that the AP 102 and the associated STAs 103 are to switch to another color. For instance, the AP 102 may use information included in such PPDUs (such as destination addresses, source addresses and/or other identifiers) to determine whether such PPDUs are intended for the AP 102. For example, such PPDUs may not be intended for the AP 102 although they include the same BSS color (the used BSS color) used by the AP 102.

In another non-limiting example, the AP 102 may detect multiple PPDUs from another AP and/or STA(s) 103 unassociated with the AP 102. The AP 102 may determine that the AP 102 and the associated STAs 103 are to switch to another color if at least one of those PPDUs includes the used BSS color.

In another non-limiting example, the AP 102 may determine that the AP 102 and the associated STAs 103 are to switch to another color based on a number of detected PPDUs (such as PPDUs from other AP(s) 102 and/or STA(s) 103 unassociated with the AP 102) include the used BSS color. For instance, if the number of such PPDUs is greater than a predetermined threshold and/or percentage, the AP 102 may determine that the AP 102 and the associated STAs 103 are to switch to another color.

The AP 102 may use any suitable technique(s) to determine the alternate BSS color. Although embodiments are not limited as such, previously described technique(s) for determination of the used BSS color may be used. For instance, the AP 102 may select the alternate BSS color from the candidate BSS colors previously described. In a non-limiting example, a 6-bit number may be used for the alternate BSS color. Embodiments are not limited to this size, however, as any suitable size may be used for the alternate BSS color.

At operation 850, the AP 102 may determine whether to switch to an alternate channel. Any suitable technique(s) may be used. In a non-limiting example, the AP 102 may determine whether the AP 102 and the associated STAs 103 are to switch from the operating channel to the alternate channel based on a signal quality measurement of the operating channel (for instance, if the signal quality measurement is greater than a predetermined threshold). Any suitable signal quality measurements may be used, including but not limited to average of signal quality measurements, average received power levels, received signal strength indicator (RSSI) measurements, signal-to-noise ratios (SNRs) and/or other. Such measurements may be performed at the AP 102 and/or STAs 103.

In another non-limiting example, the AP 102 may monitor the operating channel for PPDUs (such as PPDUs from other AP(s) 102 and/or STA(s) 103 unassociated with the AP 102). The AP 102 may determine BSS colors of those PPDUs. The AP 102 may determine whether the AP 102 and the associated STAs 103 are to switch from the operating channel to the alternate channel based on a number of the BSS colors of those PPDUs that match the used BSS color.

In some embodiments, the AP 102 may switch primary channel (such as a 20 MHz primary channel) while remaining in a same channel and/or at a same bandwidth (BW).

At operation 855, the AP 102 may transmit a CSA element that indicates the alternate BSS color. In some embodiments, the CSA element may be broadcast. In some embodiments, the CSA element may be unicast. In some embodiments, the CSA element may indicate when a BSS color switch is to occur. In some embodiments, the CSA element may be configurable to further indicate whether the AP 102 and the associated STAs 103 are to switch from the operating channel to an alternate channel for the communication between the AP 102 and the associated STAs 103. In some embodiments, the CSA element may be configurable to indicate either or both of a channel switch and BSS color switch. In some embodiments, the CSA element may be configurable to indicate one or more of: whether the AP 102 and the associated STAs 103 are to switch from the used BSS color to the alternate BSS color for the communication between the AP 102 and the associated STAs 103, whether the AP 102 and the associated STAs 103 are to use the same channel, a different channel or the same channel with a different configuration for the communication between the AP 102 and the associated STAs 103; and whether the AP 102 and the associated STAs 103 are to switch from the operating channel to an alternate channel for the communication between the AP and the associated STAs.

In some embodiments, the CSA element may indicate one of: the alternate BSS color and the alternate channel, if it is determined that the AP 102 and the associated STAs 103 are to switch from the operating channel to the alternate channel; the alternate BSS color and the operating channel, if it is determined that the AP 102 and the associated STAs 103 are not to switch from the operating channel to the alternate channel; and/or other information.

Any suitable technique(s), such as broadcast, multicast and/or unicast, may be used to transmit the CSA element that indicates the alternate BSS color. In a non-limiting example, the AP 102 may include the CSA element in a beacon frame for broadcast transmission (including but not limited to broadcast transmission in the operating channel). In another non-limiting example, the AP 102 may include the CSA element in a management frame for unicast transmission to one of the associated STAs 103 or for multicast transmission to two or more of the associated STAs 103. These examples are not limiting, as other types of frames may be used.

In some embodiments, a reliable BSS color switch method may be performed, wherein a unicast CSA element is transmitted to each associated STA 103. The switch may be performed after the CSA elements are transmitted and after ACK frames are received at the AP 102 for each of the CSA elements.

At operation 860, the AP 102 may receive one or more ACK frames for the CSA element. In some embodiments, the ACK frames may be received if the CSA element is transmitted in accordance with a unicast technique. The ACK frame(s) may indicate information such as one or more of: acknowledgement of reception of the CSA element, acknowledgement of a BSS color switch (to the alternate BSS color), acknowledgement of a channel switch (such as to the second channel), and/or other. Embodiments are not limited to ACK frames, however, as other frames and/or messages may be used.

In some embodiments, the CSA element may be transmitted as part of a process that may be the same as or similar to a channel switch procedure (which may be included in a WLAN standard and/or other standard, in some cases). In some embodiments, the CSA element and ACK frame(s) for the CSA element may be exchanged as part of a process that may be the same as or similar to a channel switch procedure (which may be included in a WLAN standard and/or other standard, in some cases)

At operation 865, the AP 102 may transmit a second downlink PPDU that includes the alternate BSS color. The alternate BSS color may be included based on the determination (by the AP 102) that the AP 102 and associated STAs 103 are to switch to the alternate BSS color.

In some embodiments, if timing is not indicated in the CSA element, the STA 103 may decode the BSS color. When the BSS color appears in a decoded PPDU, the STA 103 may determine that the BSS color switch has occurred.

In some embodiments, the AP 102 may transmit the second downlink PPDU in the operating channel (if no channel switch is to be performed) or in the alternate channel (if the channel switch is to be performed). The second PPDU may include the alternate BSS color (if the BSS color switch is to be performed). In some embodiments, the AP 102 may transmit the second PPDU during another TXOP, although the scope of embodiments is not limited m this respect. In a non-limiting example, the alternate BSS color may be included in a BSS color field of the second downlink PPDU. The BSS color field mar be in a header portion of the second downlink PPDU, although the scope of embodiments is not limited in this respect.

In some embodiments, an apparatus of an AP 102 may comprise memory. The memory may be configurable to store the alternate BSS color. The memory may store one or more other elements and the apparatus may use them for performance of one or more operations. In some embodiments, the apparatus of the AP 102 may include a transceiver to transmit the downlink PPDU and the CSA element. The transceiver may transmit and/or receive other frames, PPDUs, messages and/or other elements. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to determination of the alternate BSS color.

Figure 9:
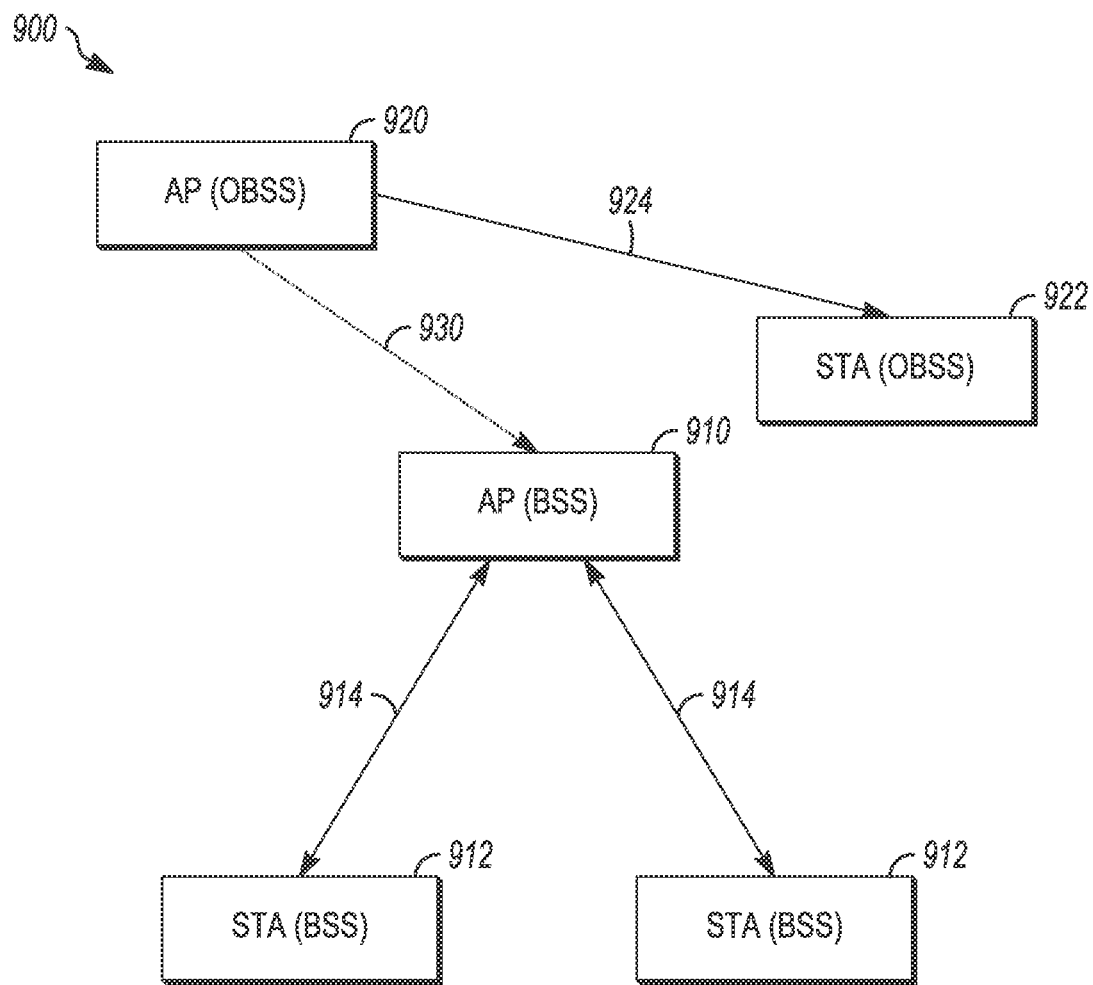
FIG. 9 illustrates an example scenario in accordance with some embodiments.
Figure 10:
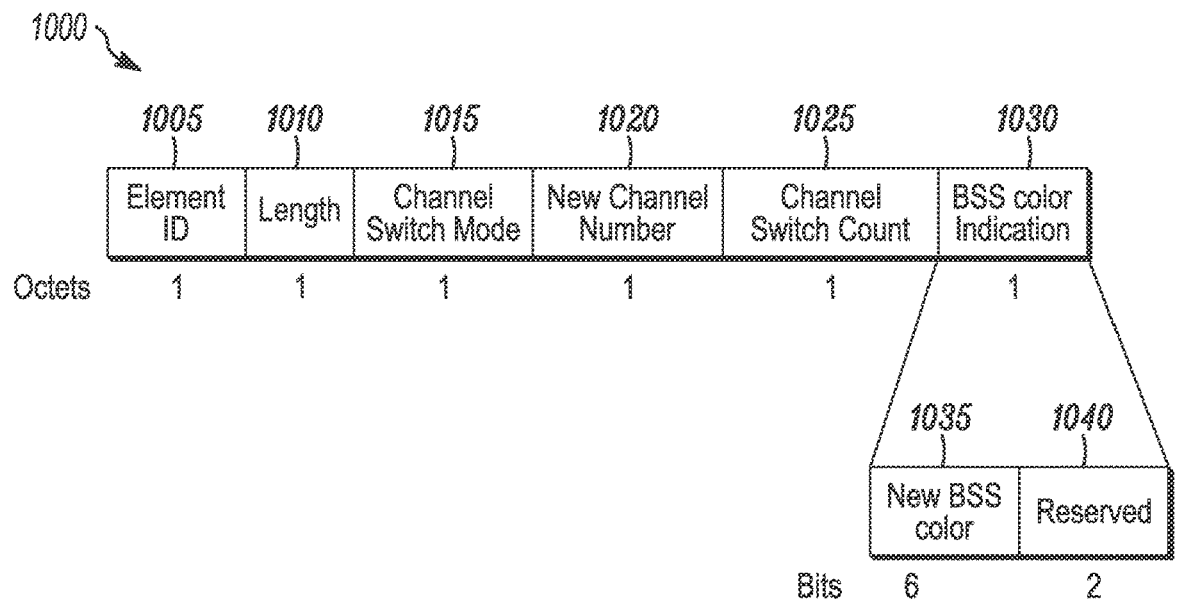
FIG. 10 illustrates an example color switch announcement (CSA) element in accordance with some embodiments.

FIG. 9 illustrates an example scenario in accordance with some embodiments. FIG. 10 illustrates an example color switch announcement (CSA) element in accordance with some embodiments. It should be noted that the examples shown in FIGS. 9-10 may illustrate some or all of the concepts and techniques described herein in some cases, but embodiments are not limited by the examples. For instance, embodiments are not limited by the name, number, type, size, ordering, arrangement and/or other aspects of the components, devices, operations, packets, frames, headers, data portions, fields, plots, curves and other elements as shown in FIGS. 9-10. Although some of the elements shown in the examples of FIGS. 9-10 may be included in a standard, such as 802.11, 802.11ax. WLAN and/or other, embodiments are not limited to usage of such elements that are included in standards.

Referring to FIG. 9, the AP 910 may communicate with STAs 912 over wireless links 914. Another AP 920 may communicate with the STA 922 over the wireless link 924. As indicated by 930, a PPDU transmitted by the AP 920 may be detected, in some cases, by the AP 910. In a non-limiting example, the AP 910 and STAs 912 may communicate using a used BSS color. Accordingly, the AP 910 and the STAs 912 may include the used BSS color in transmitted PPDUs. If the AP 910 determines that a PPDU transmitted by the AP 920 includes the used BSS color, the AP 910 may determine a alternate BSS color to use for communication between the AP 910 and the STAs 912. The AP 910 may transmit a CSA element to the STAs 912 to indicate that the AP 910 and the STAs 912 are to use the alternate BSS color. The AP 910 and the STAs 912 may subsequently include the alternate BSS color in transmitted PPDUs.

Referring to FIG. 10, the example CSA element 1000 includes an element ID 1005, a length 1010, a channel switch mode 1015, a new channel number parameter 1020, and a channel switch count 1025. The CSA element 1000 may also include a BSS color indication parameter 1030. The BSS color indication parameter 1030 may include a new BSS color parameter 1035. One or more of those parameters may be the same as, or similar to, parameters included in an 802.11 standard. WLAN standard and/or other standard, although the scope of embodiments is not limited in this respect.

In some embodiments, the CSA element 1000 may include one or more reserved bits 1040. In a non-limiting example, the reserved bits 1040 may be used to indicate information about timing of a BSS color switch (such as when the new BSS color is expected to be used).

In a non-limiting example, the CSA element 1000 may be configurable to indicate a new channel (as in 1020) and/or new BSS color (as in 1035). In a non-limiting example, the CSA element 1000 may be configurable to indicate an alternate channel (as in 1020) and/or alternate BSS color (as in 1035).

Embodiments are not limited to the above parameters. In some embodiments, one or more of the parameters shown in FIG. 10 may not necessarily be included. In some embodiments, one or more additional parameters may be included.

Figure 11:
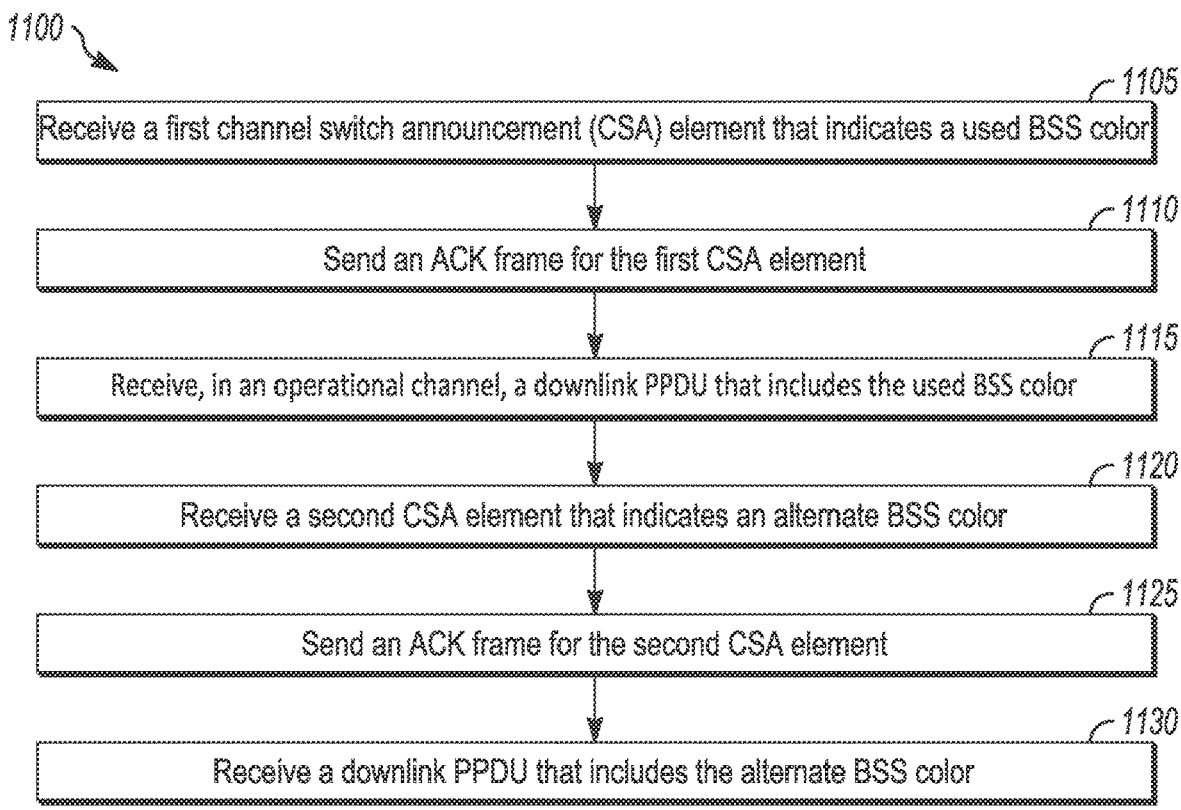
FIG. 11 illustrates the operation of another method of communication in accordance with some embodiments.

FIG. 11 illustrates the operation of another method of communication in accordance with some embodiments. As mentioned previously regarding the method 800, embodiments of the method 1100 may include additional or even fewer operations or processes in comparison to what is illustrated in FIG. 11 and embodiments of the method 1100 are not necessarily limited to the chronological order that is shown in FIG. 11. In describing the method 1100, reference may be made to any of FIGS. 1-10, although it is understood that the method 1100 may be practiced with any other suitable systems, interfaces and components. In addition, embodiments of the method 1100 may be applicable to STAs 103, APs 102, UEs, eNBs and/or other wireless or mobile devices. The method 1100 may also be applicable to an apparatus of an STA 103. AP 102 and/or other device, in some embodiments.

It should be noted that the method 800 may be practiced by an AP 102 and may include exchanging of elements, such as frames, signals, messages and/or other elements with an STA 103. The method 1100 may be practiced by an STA 103 and may include exchanging of elements, such as frames, signals, messages and/or other elements with an AP 102. In some cases, operations and techniques described as part of the method 800 may be relevant to the method 1100. In addition, embodiments of the method 1100 may include one or more operations that may be the same as, similar to or reciprocal to one or more operations of the method 800 (and/or other operation(s) described herein). For instance, an operation of the method 1100 may include reception of a message by an STA 103 and the method 800 may include transmission of a same or similar message by the AP 102.

In addition, previous discussion of various techniques, operations and/or concepts may be applicable to the method 1100 in some cases, including TXOP, contention for access to a channel, BSS color, BSS color switch, channel switch, CSA element, ACK frames for the CSA element and/or others.

The method 1100 may be practiced by an STA 103, although the scope of embodiments is not limited in this respect. In some cases, one or more operations of the method 1100 may be practiced by another mobile device and/or by another device.

At operation 1105, the STA 103 may receive a first color switch announcement (CSA) element that indicates a used BSS color. At operation 1110, the STA 103 may send an ACK frame for the first CSA element. At operation 1115, the STA 103 may receive, in an operating channel, a downlink PPDU that includes the used BSS color. At operation 1120, the STA 103 may receive a second CSA element that indicates an alternate BSS color. At operation 1125, the STA 103 may send an ACK frame for the second CSA element. At operation 1130, the STA 103 may receive a downlink PPDU that includes the alternate BSS color.

In some embodiments, the STA 103 may receive a first downlink PPDU received in a operating channel from an AP 102 during a transmission opportunity (TXOP) obtained by the AP 102. The STA 103 may determine that the downlink PPDU is from the AP 102 based on a used BSS color in a header of the downlink PPDU that indicates communication between the AP 102 and one or more associated STAs 103. The STA 103 may receive, from the AP 102, a color switch announcement (CSA) element that indicates: whether the STA 103 is to switch from the used BSS color to an alternate BSS color for the communication between the AP 102 and the associated STAs 103; and whether the STA 103 is to switch from the operating channel to an alternate channel for the communication between the AP 102 and the associated STAs 103. The STA 103 may receive a second downlink PPDU from the AP 102 in accordance with the CSA element (such as on a channel indicated in the CSA element and/or using a BSS color indicated in the CSA element).

In a non-limiting example, the CSA element may be included in a beacon frame broadcast from the AP 102. The STA 103 may transmit an acknowledgement (ACK) frame that indicates reception of the CSA element.

In another non-limiting example, the CSA element may be included in a management frame transmitted from the AP 102 to the STA 103 in a unicast transmission. The STA 103 may transmit an acknowledgement (ACK) frame that indicates reception of the CSA element.

In some embodiments, an AP 102 and/or STA 103 may include a BSS color field in PPDUs as an identifier for multi-BSSID located at the same device. The BSS color may be used to support dense networks and power save functionalities, in some cases. The BSS color may be used to enable Intra PPDU power save operation, HE NAV (HE Virtual CS—Inter-BSS STA, Intra-BSS STA), overlapping BSS (OBSS)/Spatial Reuse with Color Codes' color code based CCA rule and various features (such as in WLAN, 802.11ax and/or other protocol). For instance, the BSS color may be used in features that may depend on a differentiation of BSS.

In some embodiments, there may be a limited number (such as 6 in 802.11ax) of bits allocated for BSS color in HE PPDUs. In some cases, each P2P group may be an independent BSS and may be assigned with one color. Hence, it is possible that in a dense network, two different BSSs may choose the same color. A BSS color change scheme may be beneficial in these and other cases.

In some embodiments, a BSS color change procedure may be combined with a channel switch procedure. For instance, broadcast and unicast BSS color change indications may be sent.

In some embodiments, a color switch announcement (CSA) element may include a BSS color field. In a non-limiting example, a CSA element of a standard (such as 802.11ax and/or other) may be extended to include the BSS color change indication. In addition, channel switch frame exchange flows may be to signal when and how the BSS color is going to be changed.

In some embodiments, the AP 102 may choose the channel switch procedure to the same channel or different channel and may further indicate a new BSS color. For instance, a CSA element may be used. The AP 102 may send this indication using a broadcast frame exchange flow and/or unicast frame exchange flow (such as to a particular STA 103 and/or particular group of STAs 103). The STAs 103 may then, in response to a reception of the indication of the new BSS color (and/or the CSA element) begin to use the indicated BSS color after a time indicated by the CSA element.

In Example 1, an apparatus of an access point (AP) may comprise memory. The apparatus may further comprise processing circuitry. The processing circuitry may be configured to contend for a transmission opportunity (TXOP) to obtain access to an operating channel. The processing circuitry may be further configured to encode, for transmission in the operating channel during the TXOP, a downlink physical layer convergence procedure protocol data unit (PPDU) that includes a used basic service set (BSS) color that indicates communication between the AP and one or more associated stations (STAs). The processing circuitry may be further configured to detect, in the operating channel, another PPDU from an STA that is unassociated with the AP. The processing circuitry may be further configured to, if a header portion of the detected PPDU includes the used BSS color: determine an alternate BSS color that is to indicate the communication between the AP and the associated STAs; and encode, for transmission, a color switch announcement (CSA) element that indicates that the AP and the associated STAs are to switch to the alternate BSS color for the communication between the AP and the associated STAs.

In Example 2, the subject matter of Example 1, wherein the CSA element may be configurable to indicate whether the AP and the associated STAs are to switch from the operating channel to an alternate channel for the communication between the AP and the associated STAs.

In Example 3, the subject matter of one or any combination of Examples 1-2, wherein the processing circuitry may be further configured to determine a signal quality measurement of the operating channel. The processing circuitry may be further configured to determine, based at least partly on the signal quality measurement: whether the AP and the associated STAs are to switch from the used BSS color to the alternate BSS color for the communication between the AP and the associated STAs, or whether the AP and the associated STAs are to switch from the operating channel to the alternate channel for the communication between the AP and the associated STAs.

In Example 4, the subject matter of one or any combination of Examples 1-3, wherein the processing circuitry may be further configured to attempt to detect, in the operating channel, PPDUs that include the used BSS color. The processing circuitry may be further configured to determine a channel load estimate based on a number of detected PPDUs in the operating channel that include the used BSS color. The processing circuitry may be further configured to determine, based at least partly on the channel load estimate, whether the AP and the associated STAs are to switch from the used BSS color to the alternate BSS color for the communication between the AP and the associated STAs. or whether the AP and the associated STAs are to switch from the operating channel to the alternate channel for the communication between the AP and the associated STAs.

In Example 5, the subject matter of one or any combination of Examples 1-4, wherein the processing circuitry may be further configured to encode the CSA element to indicate one of: the alternate BSS color and the alternate channel, if it is determined that the AP and the associated STAs are to switch from the used BSS color to the alternate BSS color and that the AP and the associated STAs are to switch from the operating channel to the alternate channel, and the alternate BSS color and the operating channel, if it is determined that the AP and the associated STAs are to switch from the used BSS color to the alternate BSS color and that the AP and the associated STAs are not to switch from the operating channel to the alternate channel.

In Example 6, the subject matter of one or any combination of Examples 1-5, wherein the processing circuitry may be further configured to monitor the operating channel for overlapping basic service set (OBSS) PPDUs from STAs unassociated with the AP. The processing circuitry may be further configured to determine BSS colors of the OBSS PPDUs. The processing circuitry may be further configured to determine whether the AP and the associated STAs are to switch from the operating channel to the alternate channel based on a number of the BSS colors of the OBSS PPDUs that match the used BSS color.

In Example 7, the subject matter of one or any combination of Examples 1-6, wherein the processing circuitry may be further configured to encode the CSA element for broadcast transmission.

In Example 8, the subject matter of one or any combination of Examples 1-7, wherein the processing circuitry may be further configured to encode the CSA element in a beacon frame for broadcast transmission.

In Example 9, the subject matter of one or any combination of Examples 1-8, wherein the processing circuitry may be further configured to encode the CSA element in a management frame for unicast transmission to one of the associated STAs or for multicast transmission to two or more of the associated STAs. The processing circuitry may be further configured to decode one or more acknowledgement (ACK) frames that indicate successful reception of the management frame at one or more of the associated STAs.

In Example 10, the subject matter of one or any combination of Examples 1-9, wherein the processing circuitry further configured to, if the ACK frames are received from a predetermined group of STAs, encode one or more PPDUs, for transmission after the ACK frames are received, to include the alternate BSS color.

In Example 1, the subject matter of one or any combination of Examples 1-10, wherein the AP may be arranged to operate in accordance with a wireless local area network (WLAN) protocol. The used BSS color may include six bits. The alternate BSS color may include six bits.

In Example 12, the subject matter of one or any combination of Examples 1-11, wherein the apparatus may further include a transceiver to transmit the downlink PPDU and the CSA element.

In Example 13, the subject matter of one or any combination of Examples 1-12, wherein the apparatus may be configurable to store the alternate BSS color in the memory.

In Example 14, the subject matter of one or any combination of Examples 1-13, wherein the processing circuitry may include a baseband processor to determine the alternate BSS color.

In Example 15, a non-transitory computer-readable storage medium may store instructions for execution by one or more processors to perform operations for communication by an access point (AP). The operations may configure the one or more processors to contend for a transmission opportunity (TXOP) to obtain access to an operating channel. The operations may further configure the one or more processors to encode, for transmission in the operating channel during the TXOP, a downlink physical layer convergence procedure protocol data unit (PPDU) that includes a used basic service set (BSS) color that indicates communication between the AP and one or more associated stations (STAs). The operations may further configure the one or more processors to encode, for transmission, a color switch announcement (CSA) element configurable to indicate: whether the AP and the associated STAs are to switch from the used BSS color to an alternate BSS color for the communication between the AP and the associated STAs and whether the AP and the associated STAs are to switch from the operating channel to an alternate channel for the communication between the AP and the associated STAs.

In Example 16, the subject matter of Example 15, wherein the operations may further configure the one or more processors to detect one or more PPDUs in the operating channel that include the used BSS color and that are from one or more overlapping basic service set (OBSS) APs or OBSS STAs. The operations may further configure the one or more processors to determine, based at least partly on the PPDUs from the OBSS APs or OBSS STAs, whether the AP and the associated STAs are to switch from the used BSS color to the alternate BSS color for the communication between the AP and the associated STAs.

In Example 17, the subject matter of one or any combination of Examples 15-16, wherein the operations may further configure the one or more processors to determine whether the AP and the associated STAs are to switch from the used BSS color and the operating channel to the alternate BSS color and the alternate channel for the communication between the AP and the associated STAs.

In Example 18, the subject matter of one or any combination of Examples 15-17, wherein the operations may further configure the one or more processors to determine that the AP and the associated STAs are to switch from the used BSS color to the alternate BSS color if at least one of the PPDUs from the OBSS APs or OBSS STAs indicates the used BSS color.

In Example 19, the subject matter of one or any combination of Examples 15-18, wherein the operations may further configure the one or more processors to determine a signal quality measurement and/or BSS color usage measurement based at least partly on the PPDUs from the OBSS APs or OBSS STAs. The operations may further configure the one or more processors to determine that the AP and the associated STAs are to switch from the used BSS color to the alternate BSS color if the determined signal quality measurement is less than a first predetermined threshold and/or if the BSS color usage measurement is less than a second predetermined threshold.

In Example 20, a method of communication at a station (STA) may comprise contending for a transmission opportunity (TXOP) to obtain access to an operating channel. The method may further comprise encoding, for transmission in the operating channel during the TXOP, a first uplink physical layer convergence procedure protocol data unit (PPDU) that includes a predetermined used basic service set (BSS) color, wherein the STA is associated with an access point (AP). The used BSS color may indicate communication between the AP and one or more associated STAs. The method may further comprise detecting another PPDU from another STA that is unassociated with the AP. The method may further comprise, if a header portion of the detected PPDU includes the used BSS color: determining an alternate BSS color to be used to indicate the communication between the AP and the associated STAs, encoding, for transmission, a message that indicates the alternate BSS color: and encoding, for transmission, a second uplink PPDU that includes the alternate BSS color.

In Example 21, the subject matter of Example 20, wherein the method may further comprise attempting to detect for PPDUs that are from the AP or from associated STAs and that further include the alternate BSS color. The method may further comprise encoding the second uplink PPDU to include the alternate BSS color after detection of at least one PPDU that is from the AP or from associated STAs and that further includes the alternate BSS color.

In Example 22, an apparatus of a station (STA) may comprise memory. The apparatus may further comprise processing circuitry. The processing circuitry may be configured to decode a first downlink physical layer convergence procedure protocol data unit (PPDU) received in an operating channel from an access point (AP) during a transmission opportunity (TXOP) obtained by the AP. The processing circuitry may be further configured to determine that the downlink PPDU is from the AP based on a used basic service set (BSS) color in a header of the downlink PPDU that indicates communication between the AP and one or more associated STAs. The processing circuitry may be further configured to decode, from the AP, a color snitch announcement (CSA) element that indicates: whether the STA is to switch from the used BSS color to an alternate BSS color for the communication between the AP and the associated STAs. and whether the STA is to switch from the operating channel to an alternate channel for the communication between the AP and the associated STAs. The processing circuitry may be further configured to decode a second downlink PPDU from the AP in accordance with the CSA element.

In Example 23, the subject matter of Example 22, wherein the CSA element may be included in a beacon frame broadcast from the AP. The processing circuitry may be further configured to encode, for transmission, an acknowledgement (ACK) frame that indicates reception of the CSA element.

In Example 24, the subject matter of one or any combination of Examples 22-23, wherein the CSA element may be included in a management frame transmitted from the AP to the STA in a unicast transmission. The processing circuitry may be further configured to encode, for transmission, an acknowledgement (ACK) frame that indicates reception of the CSA element.

In Example 25, an apparatus of an access point (AP) may comprise means for contending for a transmission opportunity (TXOP) to obtain access to an operating channel. The apparatus may further comprise means for encoding, for transmission in the operating channel during the TXOP, a downlink physical layer convergence procedure protocol data unit (PPDU) that includes an operating basic service set (BSS) color that indicates communication between the AP and one or more associated stations (STAs). The apparatus may further comprise means for encoding, for transmission, a color switch announcement (CSA) element configurable to indicate: whether the AP and the associated STAs are to switch from the used BSS color to an alternate BSS color for the communication between the AP and the associated STAs. and whether the AP and the associated STAs are to switch from the operating channel to an alternate channel for the communication between the AP and the associated STAs.

In Example 26, the subject matter of Example 25, wherein the apparatus may further comprise means for detecting one or more PPDUs m the operating channel that include the used BSS color and that are from one or more overlapping basic service set (OBSS) APs or OBSS STAs. The apparatus may further comprise means for determining, based at least partly on the PPDUs from the OBSS APs or OBSS STAs, whether the AP and the associated STAs are to switch from the used BSS color to the alternate BSS color for the communication between the AP and the associated STAs.

In Example 27, the subject matter of one or any combination of Examples 25-26, wherein the apparatus may further comprise means for determining whether the AP and the associated STAs are to switch from the used BSS color and the operating channel to the alternate BSS color and the alternate channel for the communication between the AP and the associated STAs.

In Example 28, the subject matter of one or any combination of Examples 25-27, wherein the apparatus may further comprise means for determining that the AP and the associated STAs are to switch from the used BSS color to the alternate BSS color if at least one of the PPDUs from the OBSS APs or OBSS STAs indicates the used BSS color.

In Example 29, the subject matter of one or any combination of Examples 25-28, wherein the apparatus may further comprise means for determining a signal quality measurement and/or BSS color usage measurement based at least partly on the PPDUs from the OBSS APs or OBSS STAs. The apparatus may further comprise means for determining that the AP and the associated STAs are to switch from the used BSS color to the alternate BSS color if the determined signal quality measurement is less than a first predetermined threshold and/or if the BSS color usage measurement is less than a second predetermined threshold.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising: memory; and processing circuitry, configured to:
   contend for a transmission opportunity (TXOP) to obtain access to an operating channel;
   encode, for transmission in the operating channel during the TXOP, a downlink physical layer convergence procedure protocol data unit (PPDU) that includes a used basic service set (BSS) color that indicates communication between the AP and one or more associated stations (STAs);
   detect, in the operating channel, another PPDU from an STA that is unassociated with the AP;
   if a header portion of the detected PPDU includes the used BSS color:
   determine an alternate BSS color that is to indicate the communication between the AP and the associated STAs; and
   encode, for transmission, a color switch announcement (CSA) element that indicates that the AP and the associated STAs are to switch to the alternate BSS color for the communication between the AP and the associated STAs.

2. The apparatus according to claim 1, wherein the CSA element is configurable to indicate whether or not the AP and the associated STAs are to switch from the operating channel to an alternate channel for the communication between the AP and the associated STAs, and wherein the AP is configured to continue using the operating channel after transmission of the CSA element when the CSA element does not indicate to switch to the alternate channel.

3. The apparatus according to claim 2, the processing circuitry further configured to:
determine a signal quality measurement of the operating channel; and
determine, based at least partly on the signal quality measurement:
whether the AP and the associated STAs are to switch from the used BSS color to the alternate BSS color for the communication between the AP and the associated STAs, or
whether the AP and the associated STAs are to switch from the operating channel to the alternate channel for the communication between the AP and the associated STAs.

4. The apparatus according to claim 2, the processing circuitry further configured to:
attempt to detect, in the operating channel, PPDUs that include the used BSS color;
determine a channel load estimate based on a number of detected PPDUs in the operating channel that include the used BSS color;
determine, based at least partly on the channel load estimate:
whether the AP and the associated STAs are to switch from the used BSS color to the alternate BSS color for the communication between the AP and the associated STAs, or
whether the AP and the associated STAs are to switch from the operating channel to the alternate channel for the communication between the AP and the associated STAs.

5. The apparatus according to claim 2, the processing circuitry further configured to:
encode the CSA element to indicate one of:
the alternate BSS color and the alternate channel, if it is determined that the AP and the associated STAs are to switch from the used BSS color to the alternate BSS color and that the AP and the associated STAs are to switch from the operating channel to the alternate channel, and
the alternate BSS color and the operating channel, if it is determined that the AP and the associated STAs are to switch from the used BSS color to the alternate BSS color and that the AP and the associated STAs are not to switch from the operating channel to the alternate channel.

6. The apparatus according to claim 2, the processing circuitry further configured to:
monitor the operating channel for overlapping basic service set (OBSS) PPDUs from STAs unassociated with the AP;
determine BSS colors of the OBSS PPDUs; and
determine whether the AP and the associated STAs are to switch from the operating channel to the alternate channel based on a number of the BSS colors of the OBSS PPDUs that match the used BSS color.

7. The apparatus according to claim 2, the processing circuitry further configured to encode the CSA element for broadcast transmission.

8. The apparatus according to claim 2, the processing circuitry further configured to encode the CSA element in a beacon frame for broadcast transmission.

9. An apparatus of an access point (AP), the apparatus comprising: memory; and processing circuitry, configured to:
contend for a transmission opportunity (TXOP) to obtain access to an operating channel;
encode, for transmission in the operating channel during the TXOP, a downlink physical layer convergence procedure protocol data unit (PPDU) that includes a used basic service set (BSS) color that indicates communication between the AP and one or more associated stations (STAs);
detect, in the operating channel, another PPDU from an STA that is unassociated with the AP;
if a header portion of the detected PPDU includes the used BSS color:
determine an alternate BSS color that is to indicate the communication between the AP and the associated STAs; and
encode, for transmission, a color switch announcement (CSA) element that indicates that the AP and the associated STAs are to switch to the alternate BSS color for the communication between the AP and the associated STAs,
wherein the CSA element is configurable to indicate whether the AP and the associated STAs are to switch from the operating channel to an alternate channel for the communication between the AP and the associated STAs, and
wherein the processing circuitry is further configured to:
encode the CSA element in a management frame for unicast transmission to one of the associated STAs or for multicast transmission to two or more of the associated STAs; and
decode one or more acknowledgement (ACK) frames that indicate successful reception of the management frame at one or more of the associated STAs.

10. The apparatus according to claim 9, the processing circuitry further configured to:
if the ACK frames are received from a predetermined group of STAs, encode one or more PPDUs, for transmission after the ACK frames are received, to include the alternate BSS color.

11. The apparatus according to claim 2, wherein:
the AP is arranged to operate in accordance with a wireless local area network (WLAN) protocol,
the used BSS color includes six bits, and
the alternate BSS color includes six bits.

12. The apparatus according to claim 2, wherein the apparatus further includes a transceiver to transmit the downlink PPDU and the CSA element.

13. The apparatus according to claim 2, wherein the apparatus is configurable to store the alternate BSS color in the memory.

14. The apparatus according to claim 1, wherein the processing circuitry includes a baseband processor to determine the alternate BSS color.

15. A computer-readable storage medium that stores instructions for execution by one or more processors to perform operations for communication by an access point (AP), the operations to configure the one or more processors to:
contend for a transmission opportunity (TXOP) to obtain access to an operating channel;
encode, for transmission in the operating channel during the TXOP, a downlink physical layer convergence procedure protocol data unit (PPDU) that includes a used basic service set (BSS) color that indicates communication between the AP and one or more associated stations (STAs);
encode, for transmission, a color switch announcement (CSA) element configurable to indicate:
whether the AP and the associated STAs are to switch from the used BSS color to an alternate BSS color for the communication between the AP and the associated STAs, and
whether the AP and the associated STAs are to switch from the operating channel to an alternate channel for the communication between the AP and the associated STAs.

16. The computer-readable storage medium according to claim 15, the operations to further configure the one or more processors to:
detect one or more PPDUs in the operating channel that include the used BSS color and that are from one or more overlapping basic service set (OBSS) APs or OBSS STAs; and
determine, based at least partly on the PPDUs from the OBSS APs or OBSS STAs, whether the AP and the associated STAs are to switch from the used BSS color to the alternate BSS color for the communication between the AP and the associated STAs.

17. The computer-readable storage medium according to claim 15, the operations to further configure the one or more processors to:
determine whether the AP and the associated STAs are to switch from the used BSS color and the operating channel to the alternate BSS color and the alternate channel for the communication between the AP and the associated STAs.

18. The computer-readable storage medium according to claim 15, the operations to further configure the one or more processors to:
determine that the AP and the associated STAs are to switch from the used BSS color to the alternate BSS color if at least one of the PPDUs from the OBSS APs or OBSS STAs indicates the used BSS color.

19. The computer-readable storage medium according to claim 18, the operations to further configure the one or more processors to:
determine a signal quality measurement and/or BSS color usage measurement based at least partly on the PPDUs from the OBSS APs or OBSS STAs; and
determine that the AP and the associated STAs are to switch from the used BSS color to the alternate BSS color if the determined signal quality measurement is less than a first predetermined threshold and/or if the BSS color usage measurement is less than a second predetermined threshold.

20. A method of communication at a station (STA), the method comprising:
contending for a transmission opportunity (TXOP) to obtain access to an operating channel;
encoding, for transmission in the operating channel during the TXOP, a first uplink physical layer convergence procedure protocol data unit (PPDU) that includes a predetermined used basic service set (BSS) color, wherein the STA is associated with an access point (AP), wherein the used BSS color indicates communication between the AP and one or more associated STAs;
detecting another PPDU from another STA that is unassociated with the AP;
if a header portion of the detected PPDU includes the used BSS color:
determining an alternate BSS color to be used to indicate the communication between the AP and the associated STAs;
encoding, for transmission, a message that indicates the alternate BSS color; and
encoding, for transmission, a second uplink PPDU that includes the alternate BSS color.

21. The method according to claim 20, further comprising:
attempting to detect for PPDUs that are from the AP or from associated STAs and that further include the alternate BSS color; and
encoding the second uplink PPDU to include the alternate BSS color after detection of at least one PPDU that is from the AP or from associated STAs and that further includes the alternate BSS color.

22. An apparatus of a station (STA), the apparatus comprising: memory; and processing circuitry, configured to:
decode a first downlink physical layer convergence procedure protocol data unit (PPDU) received in an operating channel from an access point (AP) during a transmission opportunity (TXOP) obtained by the AP;
determine that the downlink PPDU is from the AP based on a used basic service set (BSS) color in a header of the downlink PPDU that indicates communication between the AP and one or more associated STAs;
decode, from the AP, a color switch announcement (CSA) element that indicates:
whether the STA is to switch from the used BSS color to an alternate BSS color for the communication between the AP and the associated STAs, and
whether the STA is to switch from the operating channel to an alternate channel for the communication between the AP and the associated STAs; and
decode a second downlink PPDU from the AP in accordance with the CSA element.

23. The apparatus according to claim 22, wherein:
the CSA element is included in a beacon frame broadcast from the AP, and
the processing circuitry is further configured to encode, for transmission, an acknowledgement (ACK) frame that indicates reception of the CSA element.

24. The apparatus according to claim 22, wherein:
the CSA element is included in a management frame transmitted from the AP to the STA in a unicast transmission, and
the processing circuitry is further configured to encode, for transmission, an acknowledgement (ACK) frame that indicates reception of the CSA element.

* * * * *